US008429096B1

(12) United States Patent
Soundararajan et al.

(10) Patent No.: US 8,429,096 B1
(45) Date of Patent: Apr. 23, 2013

(54) RESOURCE ISOLATION THROUGH REINFORCEMENT LEARNING

(75) Inventors: Gokul Soundararajan, Oakville (CA); Swaminathan Sivasubramanian, Seattle, WA (US); Grant A. M. McAlister, Seattle, WA (US); Rajesh S. Sheth, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 1224 days.

(21) Appl. No.: 12/059,702

(22) Filed: Mar. 31, 2008

(51) Int. Cl.
*G06F 15/18* (2006.01)

(52) U.S. Cl.
USPC .......................................................... 706/12

(58) Field of Classification Search ...................... 706/12
See application file for complete search history.

(56) References Cited

U.S. PATENT DOCUMENTS

| | | | |
|---|---|---|---|
| 2003/0135609 A1* | 7/2003 | Carlson et al. | 709/224 |
| 2005/0172291 A1* | 8/2005 | Das et al. | 718/104 |
| 2007/0088819 A1 | 4/2007 | Sinha | |
| 2009/0099985 A1* | 4/2009 | Tesauro et al. | 706/12 |

OTHER PUBLICATIONS

"Online Resource Allocation Using Decompositional Reinforcement Learning", Gerald Tesauro, American Association for Artificial Intelligence, 2005, pp. 886-891.*
"A Hybrid Reinforcement Learning Approach to Autonomic Resource Allocation", G. Tesauro, N. K. Jong, R. Das, M. N. Bennani, IBM TJ Watson Research Center, Autonomic Computing, 2006 ICAC '06. IEEE International Conference on Jun. 13-16, 2006, pp. 65-73.*

U.S. Appl. No. 12/539,920, filed Aug. 12, 2009.
Lilith, N.; Dogancay, K., "Using Reinforcement Learning for Call Admission Control in Cellular Environments featuring Self-Similar Traffic," TENCON 2005 2005 IEEE Region 10, Date: Nov. 21-24, 2005, pp. 1-6, Digital Object Identifier 10.1109/TENCON.2005. 300835.
David C. Steere, Ashvin Goel, Joshua Gruenberg, Dylan McNamee, Calton Pu, and Jonathan Walpole. "A Feedback-driven Proportion Allocator for Real-Rate Scheduling," In Proceedings of the 3rd USENIX Symposium on Operating Systems Design and Implementation, Feb. 1999, 15 pages.
Baochun Li and Klara Nahrstedt. "A control-based middleware framework for quality of service adaptations," IEEE JSAC, 1999, pp. 1-19.

* cited by examiner

*Primary Examiner* — Kakali Chaki
*Assistant Examiner* — Mai T Tran
(74) *Attorney, Agent, or Firm* — Robert C. Kowert; Meyertons, Hood, Kivlin, Kowert & Goetzel, P.C.

(57) ABSTRACT

Systems and methods for providing resource isolation in a shared computing environment using reinforcement learning (RL) techniques are disclosed. A resource isolation mechanism may be applied in a shared storage system, or database service, that limits the resource utilization of each namespace to its specified allocation. For example, the resource isolation mechanism may be used to limit the I/O utilization of database applications in a shared computing system (e.g., a system supporting a database service) to a specified limit. In such embodiments, RL techniques may be applied to the system to automatically control the rate of queries made by an application. RL techniques, such as those based on the State-Action-Reward-State-Action (SARSA) method may be effective in controlling the I/O utilization of database applications for different workloads. RL techniques may be applied globally by the service, or may be applied to particular subscribers, applications, shared resources, namespaces, or query types.

40 Claims, 10 Drawing Sheets

RESOURCE ISOLATION THROUGH REINFORCEMENT LEARNING

BACKGROUND

Database systems managing large amounts of data may distribute and/or replicate that data across two or more machines, often in different locations, for any of a number of reasons, including security issues, disaster prevention and recovery issues, data locality and availability issues, etc. These machines may be configured in any number of ways, including as a shared resource pool.

Interaction between client applications and database servers typically includes read operations (read-only queries), write operations (to store data), and update operations that can be conceptualized using a read-modify-write workflow consisting of the following steps:

The client application reads data from the database server (via a query).

The client application applies business logic and derives new or modified data.

The client application writes data back to the database server.

Dynamic resource allocation and resource limiting in a shared database environment are challenging due to the inherent nature of the database workload. For example, the correlation between I/O workload and query rate is usually non-linear, and the amount of resources consumed by each query can be affected by many factors, such as the number of rows selected by each query, the amount of processing done by each query, and the number of rows returned by each query. Solving this problem on a large scale is difficult and human intervention is costly.

Figure 1:
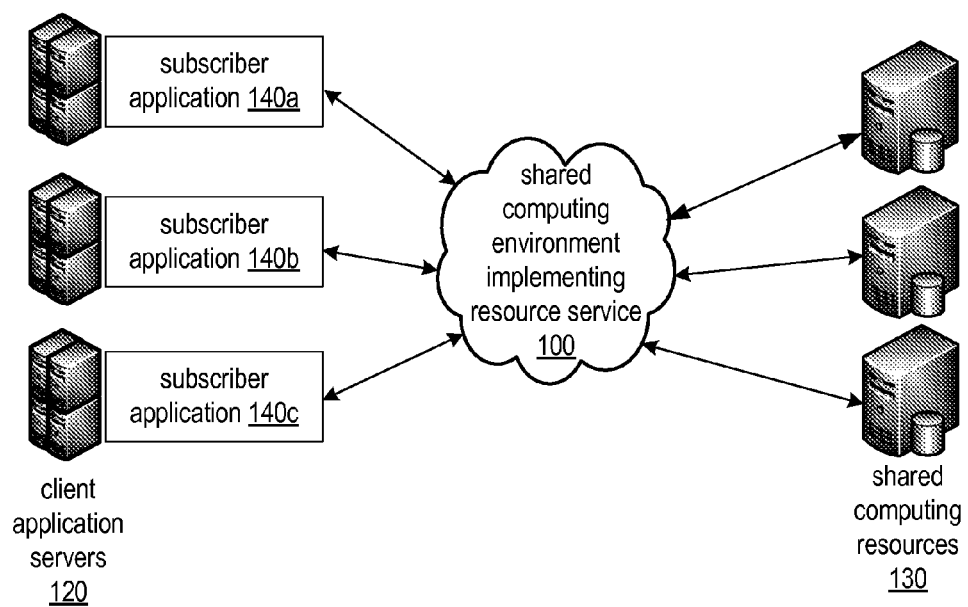
FIG. 1 is a diagram illustrating interactions between a computing resource service and subscribers to the service, according to one embodiment.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Several leading technology organizations are investing in building technologies that sell "software-as-a-service". For instance, Amazon Web services (AWS) offers a significant number of technology services, including EC2 (Elastic Computing Cloud), S3 (Simple Storage Service), SQS (Simple Query Service) and FPS (Flexible Payment Service). Such services provide access to shared storage and/or computing resources to clients, or subscribers. Within multi-tier e-commerce systems, different resources may be allocated to applications from whole machines, to CPU, to memory, and to I/O capacity.

Early work in resource allocation studied CPU allocation in the context of operating systems. In operating systems, various scheduling policies for proportional share resource allocation can be found in the literature, including a feedback-based real-time scheduler that provides reservations to applications based on dynamic feedback, eliminating the need to reserve resources a priori. Other resource allocation algorithms use a modeling approach, selecting various parameters to fit a theoretical curve to experimental data. These approaches are not generic and typically require cumbersome profiling in systems running many different workloads. In another example, parameters tuned in a proportional-integral-derivative (PID) controller are typically only valid for a given tuned workload and are not generally applicable for controlling other workloads. Other control theory and queuing models have also been investigated, but may not be suitable for application to shared computing environments with highly variable workloads. For example, they may not be suitable for modeling complex concurrency control in systems that include database applications executing in a shared computing environment (e.g., database clusters). Other efforts provide differentiated Quality of Service based on tracking customer actions and determining the correlations between customer actions, system metrics, and potential bottleneck states.

A system and methods for providing dynamic resource allocation through resource isolation in shared computing environments using reinforcement learning techniques are disclosed herein. In various embodiments, reinforcement learning (RL) may be used to design a self-regulating mechanism to adjust resource allocation in such environments. For example, such techniques may be used to limit the I/O utilization of database applications to a desired limit. Reinforcement learning is a machine learning technique that may in some embodiments be used to automatically control the rate of queries made by the application. Evaluations of various embodiments described herein have shown that such a technique can be very effective in controlling the I/O utilization of applications for different kinds of workloads in a shared database environment.

The techniques described herein may in some embodiments be used to addresses a common problem faced by storage services. Specifically, in a shared storage service that allows users to store their data and retrieve it using different styles of queries, the complexity of a query may vary based on its type. For example, a query can be as simple as "Fetch the record with primary key X". This query may be simple to execute, since the query fetches a unique item (identified by X). However, queries such as "Fetch all customer records that have shopped for book 'Harry Potter'" may take a longer time to execute, since they may be required to scan an entire inventory management database and to choose the records that match the specified condition.

In some computing environments, such as a shared storage system or database service, service level agreements may specify that certain resources are guaranteed to be available to a subscriber. For example, two clients (say A and B) may store their databases in the same physical database server. Each client may be given an agreement that they will receive a guaranteed slice of the available CPU resources (e.g., 50% of the machine's CPU power) and I/O performance (e.g., 50% of machine's capacity). In this scenario, it may be possible that if client A executes a complex query, most or all of the machine's CPU and I/O power is spent executing this complex query, thereby starving client B's queries. This may lead to violating client B's service agreement. In other words, client B may not receive its guaranteed slice of I/O capacity and/or CPU resources.

The scenario described above can occur when: (i) different databases are hosted in the same physical server and (ii) different applications store their data in the same database server. These scenarios are common when an organization allows different databases to share a single physical server, and also when they offer queryable data storage as a service. The reinforcement learning techniques described herein may in various embodiments be used to limit the I/O utilization of a client application to a desired level, thereby isolating its effects on system resources from the execution of other client applications.

A common technique to limit the performance utilization of an application is to delay its execution (commonly known as "throttling"). For instance, the number of requests accepted by the server may be limited, or the execution of a request may be delayed by a certain time period (e.g., 50 ms or 100 ms). Slowing down the request rate by accepting fewer requests or delaying their execution will naturally reduce the I/O utilization. However, the process of throttling needs to be done carefully. For example, choosing a very small delay value may result in the system not being able to sufficiently limit a given client's I/O utilization (thereby affecting performance of other clients sharing the same server), while choosing a large delay value may decrease I/O utilization well below the guaranteed limit (which may lead to poor client satisfaction). The process of throttling may include carefully considering various factors, such as a client's query request rate, the client's query type, the client's current I/O consumption, and the client's guaranteed level of I/O performance. Throttling may use different adaptive algorithms that adjust delay values based on the changes in these factors. Typically, these algorithms use simple linear correlation based predictors, PID, or other controllers.

As previously noted, the methods described herein may be used to perform resource limiting by using a machine learning technique called "reinforcement learning". Compared to various other approaches, such a technique does not require an extensive training phase prior to its application. A reinforcement learning technique may learn about client application characteristics (such as its query rate, query type, and I/O consumption) during the actual execution of an application. Using this data, the system may compute the best-suited delay values for throttling the client requests while limiting their I/O consumption to the desired level. Compared to other throttling algorithms, a reinforcement learning approach may be relatively simple to configure (e.g., compared to the extensive studies needed in order do configure a PID controller).

Reinforcement learning (RL) is machine learning concept where a learner iteratively learns correct behavior through interactions with the environment. In RL, the actions to take are not specified for the learner. Instead, the learner must discover correct actions by trial-and-error. Specifically, in a system employing RL, there exist two entities: (1) an environment and (2) an agent. An agent is connected to its environment such that it can sense the state of the environment as well as execute actions on the environment. On each step of interaction, the agent senses the current state of the environment, s, and chooses an action to take, a. The action changes the state of the environment, and the value of this state transition is communicated to the agent by a reinforcement signal, r, where the magnitude of r indicates the goodness of an action. Over time, the agent builds a policy, $\pi$, which specifies the action the agent will take for each state of the environment.

Formally, in reinforcement learning, there exists a discrete set of environment states, S; a discrete set of agent actions, A; and a set of scalar reinforcement signals, R. After learning, the system creates a policy, $\pi$, that defines the value of taking action $a \in A$ in state $s \in S$. The policy defines $Q^\pi(s, a)$ as the expected return value for starting from s, taking action a, and following policy $\pi$.

If the environment is static, then the value function $Q^\pi(s, a)$ can be solved using dynamic programming. However, many applications cannot be represented by a static system. Therefore, the value function $Q^\pi(s, a)$ may in some embodiments be estimated using a temporal difference (TD($\lambda$)) learning method of reinforcement learning. One such temporal difference method is the State-Action-Reward-State-Action (SARSA) method of reinforcement learning. Pseudo-code representing the SARSA method, according to one embodiment, is given below:

Require: Initialize Q(s, a)
1: Observe current state s
2: while s is not an end state do
3: Choose a from s using Q(s, a)
4: Take action a
5: Observe r and new state s'
6: Choose action a' from s' using Q(s, a)
7: Update Q(s, a)←Q(s, a)+α[r+γQ(s', a')−Q(s, a)]
8: Set s←s'
9: Set a←a'
10: end while This pseudo-code illustrates the iterative nature of reinforcement learning. Initially, the state (s) of the system is observed. If s is not terminal, the system may proceed to take an action. In this example, a terminal state is defined as one in which no action can be taken, e.g., the end of a game. In some embodiments, the value table Q(s, a) is consulted to find the best action to take; i.e. the one that produces the maximum reward. With $\epsilon$ probability, the system proceeds to take this action. This is called the $\epsilon$-greedy method. By picking a non-greedy move some of the time, moves that may not normally be taken (e.g., using other algorithms) may be explored. Taking one of these non-greedy moves may in some embodiments allow the system to explore new paths to a solution and to find better paths over time. After executing an action (a), the system may be observed to determine if the action was beneficial or detrimental to the environment. If the action was beneficial, a positive reward may be received. Otherwise, a negative reward may be received. In other words, in some embodiments, the sign of the reward signifies whether it was beneficial or detrimental to the environment. In various embodiments, the magnitude of the reward may signify the magnitude of the effect (e.g., the goodness or badness of the action). Due to the action taken, the environment moves to a new state, s'. The value table may be updated using the feedback obtained from the environment. In the example illustrated above, the system may iterate until the terminal state is reached.

The application of RL algorithms may be further illustrated using an example of creating a computer-based game player. Tic-tac-toe is board game played by two players on a three-by-three grid. One player places Xs on the board and the other places Os on the board until a player wins by placing three of his/her marks in a row either horizontally, vertically, or diagonally. The game is declared a draw if no player manages to place three marks in a row. To use reinforcement learning to play tic-tac-toe, a list of possible states S and a list of possible actions A are constructed. There are 27 states in tic-tac-toe, one for each possible state of the game. The action that a player may take is to place his/her mark (either X or O) in one of 9 spaces on the board. Using the states and actions as defined, the value table Q(s, a) may be constructed, where each value represents the probability of winning from that state.

In this example, the value table Q(s, a) is initialized with 0.5, representing that there is a 50% chance of winning from every state. As part of an initial training process, some number of games may be played. At each step of a game, a move may be picked by looking at the empty spaces on the board. With $\epsilon$ probability, a greedy move may be selected, i.e., a move that is estimated to have the highest reward, based on the current value table. Otherwise, a non-greedy move may be selected. Picking a non-greedy move may allow the system to explore other options that may lead to higher rewards. After taking an action, the corresponding element of the value table may be updated using the SARSA algorithm. After playing many games, the values in Q(s, a) will converge to $Q^\pi(s, a)$, the optimal policy for playing tic-tac-toe.

Reinforcement learning techniques, such as those described above, may be applied to resource management (e.g., resource allocation and isolation) in a shared computing environment, in some embodiments. For example, FIG. 1 illustrates interactions between a service that provides access to shared computing resources and subscribers to the service, according to one embodiment. In this example, one or more subscribers to a shared computing service may execute subscriber applications 140 on one or more client application servers 120. As illustrated in FIG. 1, subscriber applications 140 may in some embodiments interact with one or more shared computing resources 130 via a shared computing environment 100 implementing a resource service. For example, in some embodiments, a subscriber application 140 may connect with the service through a web browser executing on a client application server 120 to send a request for computing services to the resource service in shared computing environment 100. The resource service may assign one or more of shared computing resources 130 to execute the request and may open a connection between the subscriber application 140 and the shared computing resource 130. In this example, the shared computing resources 130 may return results of the request to the subscriber application 140 through the resource service. In other embodiments, once a connection is made between a subscriber application 140 and a shared computing resource 130, subsequent communication between the two may take place without the intervention of the resource service.

Figure 2:
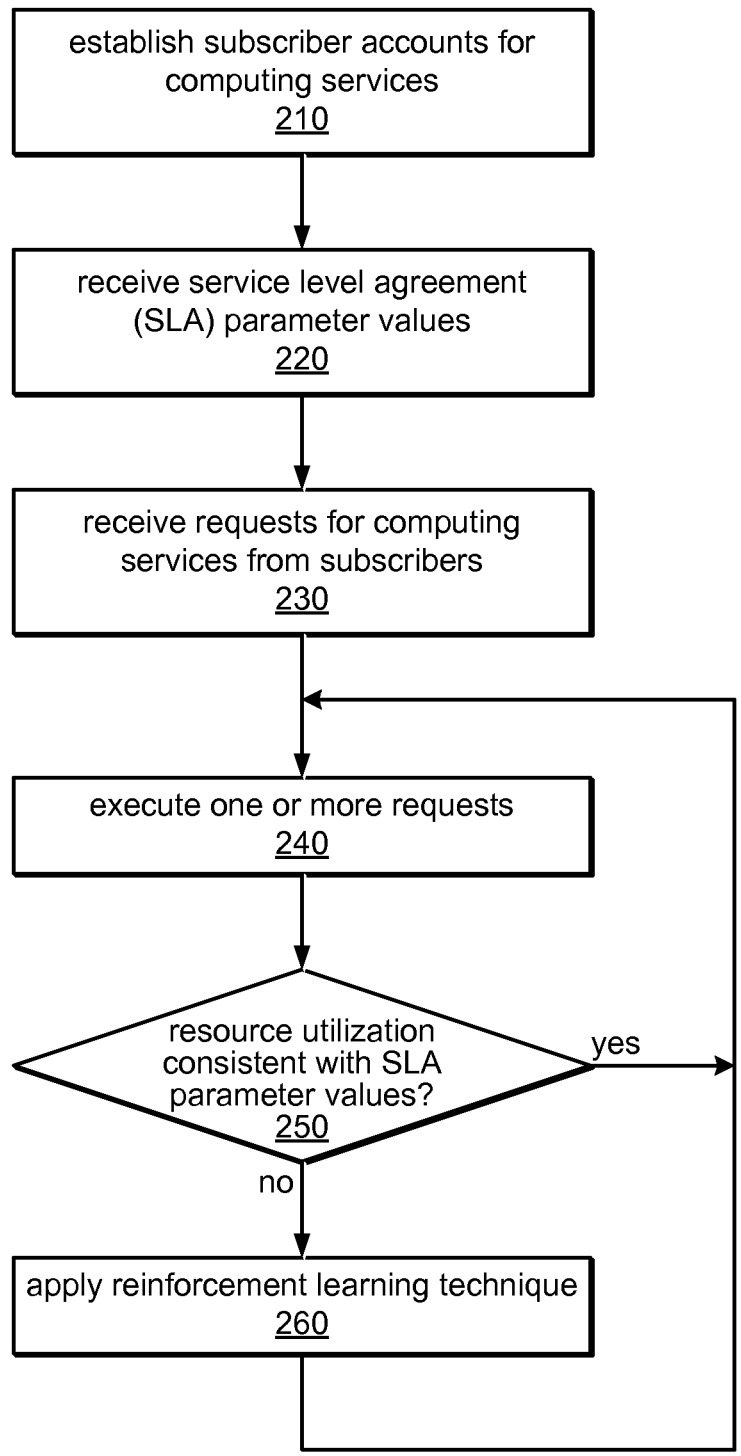
FIG. 2 is a flow chart illustrating one embodiment of a method for implementing resource isolation in a computing resource service.

FIG. 2 illustrates one embodiment of a method for implementing resource isolation in a computing environment providing computing services on shared computing resources, such as that illustrated in FIG. 1. In this example, the method may include establishing accounts for computing services on behalf of a plurality of subscribers, as in 210. The method may also include receiving service level agreement (SLA) parameter values, as in 220. In various embodiments, SLA parameter values may be received from the subscribers themselves (e.g., through a web interface), or may be negotiated as part of establishing a subscriber account. SLA parameter values may be applied globally to all service requests, or may be applied on a per-application basis, a per-subscriber basis, or on any other suitable subset of the services to be performed by the shared service, in different embodiments. Examples of SLA parameter values that may be specified in a shared computing environment include, but are not limited to, a quantity or percentage of available I/O resources, a quantity or percentage of available CPU resources, a number of connections to the shared resources, an amount or percentage of available storage memory, and an amount or percentage of available execution memory. Resource quantities and/or percentages may in various embodiments be specified as minimum allocations, maximum allocations, a guaranteed allocation, or a fixed allocation.

As illustrated in FIG. 2, the method may include the shared computing service receiving a plurality of requests for computing services from the subscribers of the service, as in 230. For example, a subscriber application 140 may connect to the service to execute a complex, compute-intensive mathematical calculation or simulation using a large number of CPUs and/or specialized computing hardware included in shared computing resources 130, in some embodiments. In another example, a subscriber application 140 may connect to the service to execute a financial transaction using a shared financial services application running on one or more shared computing resources 130. In yet another example, a subscriber application 140 may connect to the service to obtain access to a shared filed system maintained on one or more of shared computing resources 130.

The method may include the computing service executing one or more of the received requests on the shared computing resources 130, as shown at 240 of FIG. 2. In this example, after beginning execution of one or more of the requests, an agent of the service may determine if the resource utilization of the shared computing environment is consistent with the received SLA parameter values, as in 250. For example, the agent may be configured to determine the CPU utilization of each of the currently executing requests and to ascertain whether execution of any of the requests has resulted in the request exceeding its allocated share of the CPU capacity of the shared computing resources 130. In other embodiments, any or all of a service request rate, a service request execution rate, a service request type, an input/output resource utilization rate, an input/output resource utilization trend, an input/output operation rate, an input/output operation trend, a CPU utilization, a CPU utilization trend, a connection request rate, a current number of connections, storage memory usage, a storage memory usage trend, execution memory usage, an execution memory trend, a service request return data volume, a service request return data volume trend, or any other performance metric may be monitored to determine compliance with the received SLA parameter values. Note also that, in different embodiments, such monitoring may be performed in the context of the shared computing system as a whole, or in the context of a particular subscriber, a particular application, a particular service request, a particular workload type, or a particular workload (e.g., when SLA parameter values are associated with various subsets of the service requests). If it is determined that the currently executing requests are executing within the received SLA parameter values, shown as the positive exit from 250, the method may include continuing execution of the received requests, shown as the feedback loop to 240.

Figure 3:
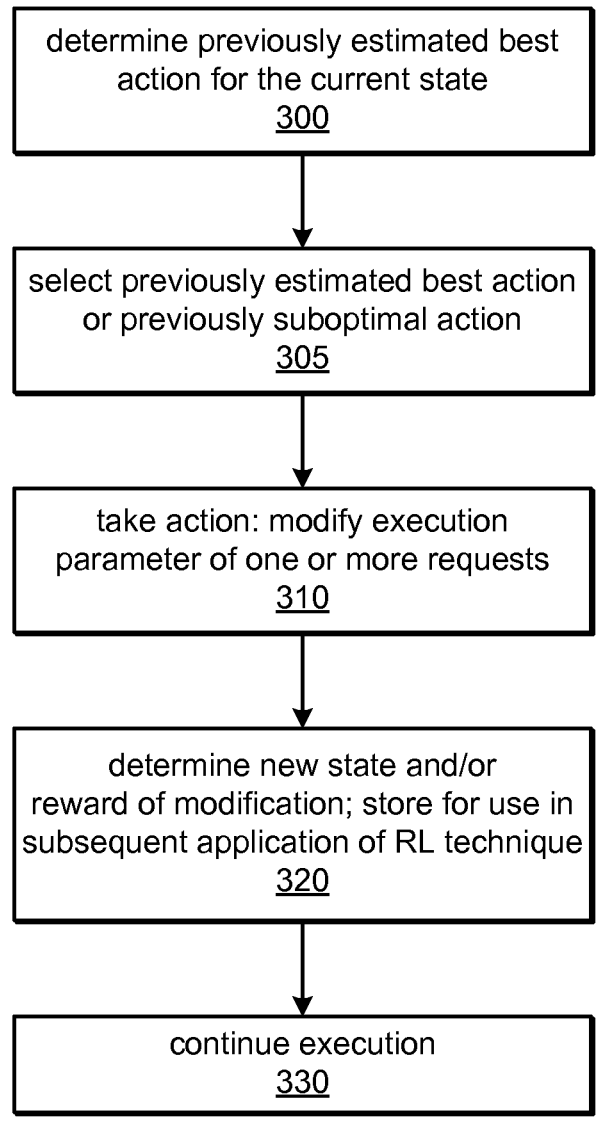
FIG. 3 is a flow chart illustrating one embodiment of a method for applying a reinforcement learning technique to resource isolation in a computing resource service.

If it is determined that one or more of the requests are executing outside of the received SLA parameter values, shown as the negative exit from 250, the method may include applying a reinforcement learning technique in an attempt to correct the situation, as in 260. An example of such a technique is illustrated in FIG. 3 and described in detail below. Once a correction has been attempted, the method may include continuing execution of the received requests, shown as the feedback loop to 240. Note that at any point during the execution of the method illustrated in FIG. 2, additional requests for computing services may be received and executed and/or additional subscriber accounts may be established. As any additional requests for services are received from new or existing subscribers and executed, the method may include performing the operations illustrated in elements 240-260 for these requests, as well. However, for clarity, these additional iterations of the method are not shown.

The application of reinforcement learning to resource isolation shown as 260 in FIG. 2 may be further illustrated by the flow chart in FIG. 3. In this example, it is assumed that the method is invoked in response to determining that the shared computing environment is operating outside of one or more of the received SLA parameter values, as shown in FIG. 2. In this example, the method may include determining an action that was previously estimated to be the best action to take for the current state, as in 300. For example, in some embodiments, a Q(s, a) reward table may be consulted to determine the best action to take, based on the current policy. As illustrated in FIG. 3, the method may include selecting one of a plurality of available actions to take, as in 305. The available actions may include the previously estimated best action and one or more actions that were previously considered to be suboptimal. As described in more detail herein, determining whether to select a previously estimated best action or an action that was previously considered to be suboptimal may in some embodiments be dependent on a learning rate and/or discount factor of the particular RL technique being applied.

The method may include taking the selected action, which may include modifying an execution parameter associated with one or more of the currently executing (or currently pending) service requests, as in 310. For example, if it is determined that one of the currently executing requests is consuming more of the CPU capacity than its SLA parameter values specify, the action may include changing an execution parameter to de-allocate one or more CPUs from execution of that request. In another example, if it is determined that one of the currently executing requests is consuming more memory during execution than its SLA parameter values specify, the action may include changing an execution parameter so that fewer complex calculations are performed in parallel, or inserting a delay between the complex calculations included in a single request so that other requests may use the memory between the calculations. Note that a modified execution parameter may, in different embodiments, be associated with all service requests (e.g. it may be applied globally), or may be associated with a particular subscriber, a particular client application, a particular service request, or a particular service request type. Note also that an execution parameter of one or more particular service requests may be modified in an attempt to correct an inconsistency with global or local SLA parameter values, whether or not the particular request(s) for which an execution parameter is modified are executing outside of their associated SLA parameters. In other words, a modification to an execution parameter of a given service request may correct an SLA inconsistency of a different service request, or may correct a global SLA inconsistency, even if the given service request was operating within its own limits prior to the modification.

Once an action has been taken, the method may include determining the new state of the shared computing environment and/or determining the reward associated with having taken the action, as in 320. For example, the CPU utilization of each of the currently executing requests may be determined or the memory utilization of each of the currently executing requests may be determined. Using this information, a reward may be calculated for the action. In some embodiments, if the action improved the operation of the shared computing environment, with respect to the SLA parameter values, the reward value may be represented by a positive number, but if the action caused the situation to deteriorate, the reward value may be represented by a negative number.

As shown in 320, the new state and/or reward value may be stored for use in a subsequent application of the RL technique, e.g., in a subsequent iteration of the loop illustrated in FIG. 2. In some embodiments, a value in a Q(s, a) reward table corresponding to the current state and action taken may be updated to reflect the effect of the action before execution continues in 330. If the action taken corrected the mismatch between the state of the shared computing environment and the specified SLA parameter values, the method illustrated in FIG. 2 may continue to execute currently executing or pending requests, shown as the feedback loop from 260 to 240, without needing to invoke the RL mechanism again. If, on the other hand, the state of the shared computing environment is still inconsistent with the specified SLA parameter values, the method illustrated in FIG. 2 may include invoking the RL mechanism a second time so that a second action may be taken in an attempt to correct the situation.

As previously noted, in some embodiments, reinforcement learning techniques may be applied to resource isolation in a database service. Note that as used herein, the term "database service" may refer to any shared storage service, whether it stores data for clients in a single organization, or provides storage and retrieval services for external and/or commercial clients. In some embodiments, a database service may allow users (which may also be referred to as "subscribers") to "lease" a virtual relational database (also known as a "namespace"). The service may allow clients to perform queries (e.g., SQL queries) against the leased namespace. In some embodiments, the service may allow users to lease a virtual database having a specified allocation of memory (e.g., for data storage), CPU resources, and/or I/O resources. The use of a database service may abstract away the specific type and/or configuration of underlying hardware and/or software (e.g., database engines) from application developers and/or users of those applications, and may allow them to be executed on any suitable hardware and/or software platform by the service, transparent to the developers and/or users. Such a service may be implemented using a collection of identical hardware and software components, or using a heterogeneous collection of hardware and/or software components, which may include multiple types of database servers and/or database engines. In some embodiments, a database service may provide the same interface and query semantics that developers already use with their own databases (e.g., those implemented using Oracle RDBMS from Oracle, Inc., or open source MySQL® databases). In other embodiments, a database service may provide different kinds of interfaces (e.g., Web and command line interfaces) for client applications.

As noted above, a developer may store his or her data in a namespace managed by the database service, and each namespace may be conceptually seen as a virtual database. In some embodiments, a database service may require the developer to choose a partition key for a namespace, by which all tables in the namespace would be partitioned. For example, in some embodiments the partition key may include a customer identifier, order number, or other significant parameter by which all data in the namespace would be partitioned. In various embodiments, the database server may automatically partition and/or replicate the namespaces across multiple database servers, which may be called a replica group.

Figure 4:
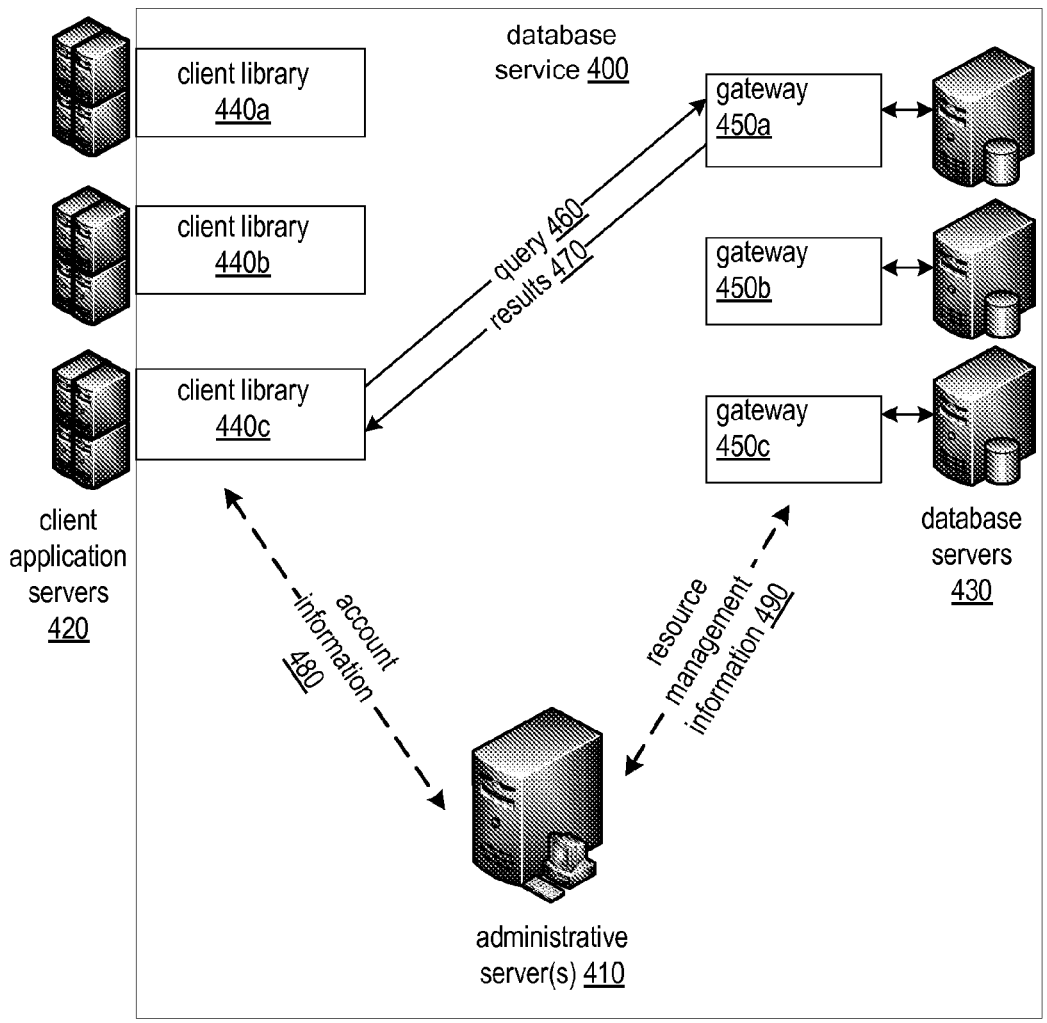
FIG. 4 is a diagram illustrating interactions between a database service and subscribers to the service, according to one embodiment.

FIG. 4 illustrates one example of a computing environment that provides a database service 400, as described above. In this example, the functionalities described above may be provided by the following four logical components: an administrative tier, a client-side routing tier, a gateway tier, and a database tier. In the example illustrated in FIG. 4, a database service 400 may include one or more administrative servers 410, one or more client libraries 440, one or more gateways 450, and one or more database servers 430. As illustrated in FIG. 4, a gateway 450 may receive queries 460 on behalf of a client application through a client library 440, and results 470 may be returned to the client application via the client library 440. In the example illustrated in FIG. 4, each gateway 450 supports a respective database server 430, and each client library 440 supports interaction with a respective external client application server 420. However, in other embodiments, these components may exhibit a different relationship than the one-to-one model illustrated. It should be understood that the database service 400 illustrated in FIG. 4 represents just one embodiment of a shared storage system, and that in other embodiments the functionality described herein may be implemented using more, fewer, or different components and may be partitioned between various components in a manner different than that described herein and illustrated in FIG. 4.

In the embodiment illustrated in FIG. 4, the administrative tier, implemented on one or more administrative servers 410, is the administrative interface through which users can administer their namespaces. In some embodiments, developers may create namespaces and/or relational database tables using simple interfaces to administrative servers 410 (e.g., web based interfaces). As noted above, each namespace may be partitioned across multiple namespaces. In the example illustrated in FIG. 4, the client-side routing tier, implemented as client library 440, may provide a mechanism to route client queries to the correct partition. In some embodiments, this tier may also be responsible for aggregating the results of a query that spans multiple partitions to provide a unified result set to the client application. Client library 440 may in some embodiments be implemented as an emulated JDBC driver that encapsulates the client library portion of a database service. Note that the client libraries 440 illustrated in FIG. 4 as being components of the overall database service 400 may, in different embodiments, reside on (and be executed on) client application servers 420 or on administrative server 410.

In this example, the gateway tier, shown as gateways 450 in FIG. 4, may serve as the entry point for accessing the physical database servers 430. In some embodiments, gateways 450 may handle the process of user authorization, query execution, and resource isolation. Note that in some embodiments, each database server may include multiple namespaces, and each namespace may be accessed through a respective gateway 450. In some embodiments, the primary function of the gateway tier may be summarized as "to receive a client query and execute it according to the guaranteed resource constraints, while handling events such as network and server failures behind the scenes". To this end, clients may not communicate directly with the physical database servers 430. Instead, all queries may be routed through a gateway process 450, as illustrated in FIG. 4. In some embodiments, a single gateway process 450 may run on each database server 430, and may serve as the gateway for executing any query at its corresponding database server 430. The gateway 450 may be responsible for handling client requests and interacting with the administrative tier to handle events such as repartitioning and background maintenance tasks.

The functionalities of the gateway tier may include both client request management tasks and administrative tier management tasks. For example, client request management tasks provided by gateway 450 may include client connection pooling. For example, in one embodiment, for each CPU resource leased, the service may include a standard allocation of 100 connections to the namespace or to each partition of the namespace, which may be managed by gateway 450. Administrative tier management tasks provided by gateway 450 may include working with the administrative tier to perform the creation, modification, and/or deletion of namespace ranges in each database. For example, gateway 450 may in some embodiments execute the creation, modification, and/or deletion of objects in its corresponding local database. Gateway 450 may also execute background maintenance tasks such as backups and index rebuilding, in some embodiments.

The database tier, implemented on database servers 430, in this example, may handle the process of data replication, handle failures of database servers, handle network failures, and provide the necessary levels of durability guarantees. In general, the database tier comprises a database (e.g., implemented on one or more database servers 430) and its management services. The database tier may in some embodiments provide for high availability through the use of a primary (i.e., writable) database and readable replicas with automated failover between the two during failures. The database tier may support backup and recovery operations by providing the ability to perform hot backups of the entire database or of a particular namespace, in various embodiments. Finally, the database tier may provide final control over resource allocations to the namespaces.

Note that in some embodiments a database service may guarantee that the subscriber can utilize a specified allocation of resources, rather than, or in addition to, guaranteeing a particular latency or throughput (which may be highly dependent on the complexity of a given query and/or the size and complexity of the target database). Note also that in some embodiments, a subscriber may request a particular type or style of available hardware for their namespace, and the use of this hardware may also be guaranteed by the service. For example, in various embodiments the administrative tier 410 and/or the gateway 450 may include functionality to implement the resource isolation techniques described herein.

An administrative server 410 may also provide metric reporting functionality, in some embodiments. For example, a client application may request metrics associated with one of its namespaces or a subscriber may request such metrics directly through a web services API. If metrics are requested, the administrative server 410 may gather, concatenate, and/or compute the requested metrics and then return the results to the client. In various embodiments, the administrative server 410 may provide metrics and monitoring of the overall health of the database service (e.g., overall metrics of the service) and/or metrics associated with particular namespaces, users, etc. For example, in some embodiments, the metrics that are available through the administrative server may include elapsed time, CPU usage, I/O usage, the number of committed writes, etc. In some embodiments, the metrics may include a ranking of query frequency (e.g., the top 10 queries performed for a given namespace, partition, or subscriber). These metrics may be available at multiple levels including, in various embodiments, per statement, per client application, per access account (e.g., per user or subscriber), per client host (e.g., per client application server 420), per namespace, per partition, or per partition copy within a replica group. In some embodiments, statistics such as size, access counts and/or frequency, and cardinality may be available for all objects. In some embodiments details regarding a query plan, such as how the query will access tables (e.g., what keys and/or search criteria will be used and in what order), may be provided, similar to details provided by commercially available database implementations. This may include details about any aggregation work performed at the client.

As noted earlier, the administrative tier may serve as the administrative interface to both clients (e.g., those executing on client application servers 420) and databases (e.g., those implemented on database servers 430). Therefore, the tasks of the administrative tier may be thought of as including two different types of tasks: client-side tasks and server-side tasks. For example, client-side administration interfaces may include functionality necessary to support account and/or namespace management (e.g., account or namespace creation, life-cycle management, deletion, and/or modification). This is illustrated in FIG. 4 as the exchange of account information 480. Server-side interfaces may in some embodiments include functionality to support capacity allocation and resource isolation (as described herein), illustrated as the exchange of resource management information 490 in FIG. 4.

In some embodiments, resource isolation may be implemented on a database service, such as that illustrated in FIG. 4, using reinforcement learning. For example, resource isolation may be applied to a database hosting system that hosts multiple databases in a single server. As noted above, to guarantee reasonable performance for each database, each subscriber, database or virtual database (i.e., namespace) may be associated with a particular SLA contract. In one embodiment, per the service contract, each namespace may be configured to deliver a certain level of performance defined in terms of a number of CPU resources and/or a number of I/O operations per second (IOPS). The service provider may be responsible for ensuring that each namespace receives the level of resources specified by the contract and for preventing any namespace from using more than what is specified in the contract. As described above, in some embodiments the quantity of resources used by each namespace may be controlled by throttling the amount of work done by each namespace. In some embodiments, the process of CPU allocation may be managed using RL techniques, while in others CPU allocation may be managed by other entities (e.g., the database engine or the operating system) using proportional schedulers or other methods. The following example of the use of reinforcement learning for resource isolation is directed to providing the number of IOPS defined by the service contract.

In this example, the amount of I/O capacity used by a namespace may be managed by applying RL to dynamically throttle the amount of work done by a namespace, when necessary. In this example, a service contract specifies that a namespace will receive an I/O capacity between minIOPS and maxIOPS. In some embodiments, an agent (in this case, a "throttler") may sense the I/O utilization of a namespace (i.e., its state) and may perform various actions (e.g., throttling) to maintain the I/O usage within the parameter values set forth in the SLA. In this example, the namespace can read and write from disk. Reading data from disk generates READ_IOPS and writing to disk generates WRITE_IOPS. The state of the namespace is defined in terms of the amount of READ_IOPS and WRITE_IOPS done by each namespace. The IOPS are mapped to a configurable number of intensity levels, thus mapping the metric from a large continuous space to a small set of distinct states. For example, if the SLA defines minIOPS to be 50 and maxIOPS to 100, the namespace is considered to be using a LARGE amount of I/O if the measured IOPS is 80.

In this example, there are three different opportunities to throttle a namespace, corresponding to three operations that take place for each database query: (1) opening a connection to the database, (2) executing the query, and (3) fetching the results of the query. In each of these operations, different amounts of delay may be added to limit the amount of work done by the namespace. The delay values may also be defined as discrete values (and may be associated with labels that are easily understandable). Finally, a reward function may be defined that returns a higher reward value if the IOPS are maintained between minIOPS and maxIOPS (the target), and progressively lower reward values if the IOPS are higher than maxIOPS or lower than minIOPS. For example, in one embodiment, the reward value may be inversely proportional to the Cartesian distance between the target and the current measured IOPS.

With the states, actions, and rewards defined above, the resource isolation mechanism may proceed to throttle the IOPS as follows. The throttler may continuously monitor the number of IOPS issued by each namespace. In this example, if the aggregate IOPS used by all the namespaces is approaching the physical limit of the machine, the throttler may begin to throttle any of the namespaces that are using more than their allocated number of IOPS. The system (e.g., the agent or throttler) may monitor the environment to determine the state of one such namespace and may check the value table, Q(s, a) to retrieve the best action to take based on past experience. The throttler may execute the action and measure the benefit of the taken action. The throttler may then update the particular element in the Q(s, a) value table based the new feedback. This process may be repeated periodically or continuously, in different embodiments. However, to learn new methods of throttling, the agent (i.e., the throttler) may choose a previously suboptimal action with the hope of discovering a better action for the current state. To this end, in some embodiments, before deciding on a new action, the agent may choose the best possible action with a probability of γ and may choose a random action with probability 1−γ. Using this scheme, the throttler may explore random (possibly suboptimal) actions once in a while. For example, if γ is set to 0.99, then the throttler may choose the action that has provided the best value in the past 99% of the time and a possibly suboptimal action 1% of the time. By exploring new actions and exploiting past experiences, the agent may quickly learn the best actions to take to limit the namespace within the limits defined in the service contract.

Figure 5:
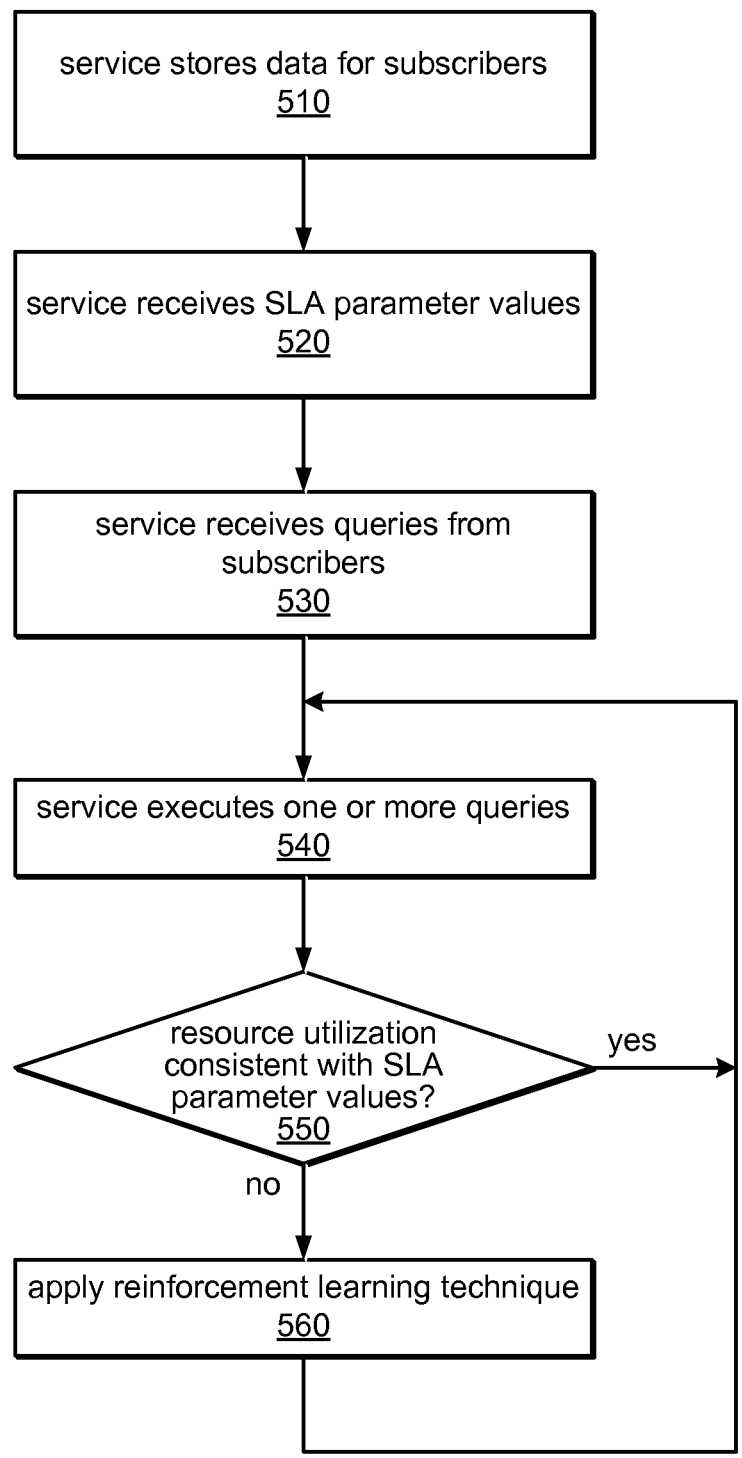
FIG. 5 is a flow chart illustrating one embodiment of a method for implementing resource isolation in a database service.

One method for applying a reinforcement learning technique to resource isolation in a shared database service is illustrated in FIG. 5. For example, in one embodiment, the method illustrated in FIG. 5 may be applied to resource isolation during execution of queries by database service 400 of FIG. 4. In the example illustrated in FIG. 5, the database service stores data for one or more subscribers to the service, as in 510. The database service may receive SLA parameter values, as in 520. Examples of SLA parameter values that may be specified in a database service include, but are not limited to, a quantity or percentage of available I/O resources, a quantity or percentage of available CPU resources, a number of connections to the database service, an amount or percentage of available storage memory, and an amount or percentage of available execution memory. Resource quantities and/or percentages may in various embodiments be specified as minimum allocations, maximum allocations, a guaranteed allocation, or a fixed allocation. For example, an SLA contract may specify that a subscriber is to be allocated the equivalent of one CPU and 100 Gbytes of storage space for a given namespace.

In some embodiments, received SLA parameter values may apply globally to all namespaces managed by the service and/or to all query requests directed to the service. In other embodiments, various SLA parameter values may be associated with particular subscribers, particular applications, particular queries, particular namespaces, particular query types, particular query templates, or any other suitable subset of the query requests to be handled by the database service. For example, SLA parameter values may be received from a subscriber when a subscriber account is set up or when a namespace is created on behalf of the subscriber, or may be negotiated with the subscriber as part of account creation, namespace creation, or at any other time. In some embodiments, a default or initial set of SLA parameter values may be used for some period of time. A default or initial set of SLA parameter values may in some embodiments be overridden by the system in response to a change request from a subscriber, in response to additional capacity being added to the system, in response to a reduction in capacity of the system, in response to the relative priority of different subscribers, namespaces, or query types, or in response to an agreement to allocate additional capacity to a given subscriber or namespace over time or during peak periods (e.g., based on a premium service level agreement).

Note that SLA parameter values may be received as part of a request for database services, in some embodiments. For example, a request for services may be performed by exchanging one or a series of messages between the service and a potential subscriber in order to establish the potential subscriber as a subscriber to the service and/or to set up his or her account. For example, a message from the subscriber to the service may include an indication that the subscriber wishes to create a new namespace, and may include any or all of a namespace identifier, service level parameter values, a database schema, and a partition key. In response to a request to create a new namespace, the administrative server 410 may create the requested namespace (including, e.g., tables, indexes, etc.), allocating resources and managing resource allocation settings according to the parameter values included in the request.

In the example illustrated in FIG. 5, the method may include the database service receiving queries from one or more subscribers directed to namespaces stored by the service. This is shown at 530. For example, queries 460, illustrated in FIG. 4, may be directed to one or more of database servers 430 on which portions of a namespace are stored by the database service 400. The service 400 may begin executing the queries against the data stored on the database servers 430, as shown in 540. In this example, after beginning execution of one or more of the queries, an agent of the service may determine if the resource utilization of the shared computing environment is consistent with the received SLA parameter values, as in 550. For example, the agent may be configured to determine the IOPS of each of the currently executing queries and to ascertain whether execution of any of the queries has resulted in the query exceeding its allocated share of the I/O capacity of the database service 400, or if the aggregated IOPS of all currently executing queries exceeds the I/O capacity of the database service 400. In other embodiments, any or all of a query request rate, a query execution rate, a query type, an input/output resource utilization rate, an input/output resource utilization trend, an input/output operation rate, an input/output operation trend, a CPU utilization, a CPU utilization trend, a connection request rate, a current number of connections, storage memory usage, a storage memory usage trend, execution memory usage, an execution memory trend, a query return data volume, a query return data volume trend, or any other performance metric may be monitored to determine compliance with the received SLA parameter values. Note also that, in different embodiments, such monitoring may be performed in the context of the database service as a whole, or in the context of a particular subscriber, a particular application, a particular namespace, a particular query, a particular query type, or a particular query template (e.g., when SLA parameter values are associated with various subsets of query requests). If it is determined that the currently executing queries are executing within the received SLA parameter values, shown as the positive exit from 550, the method may include continuing execution of the received queries, shown as the feedback loop to 540.

Figure 6:
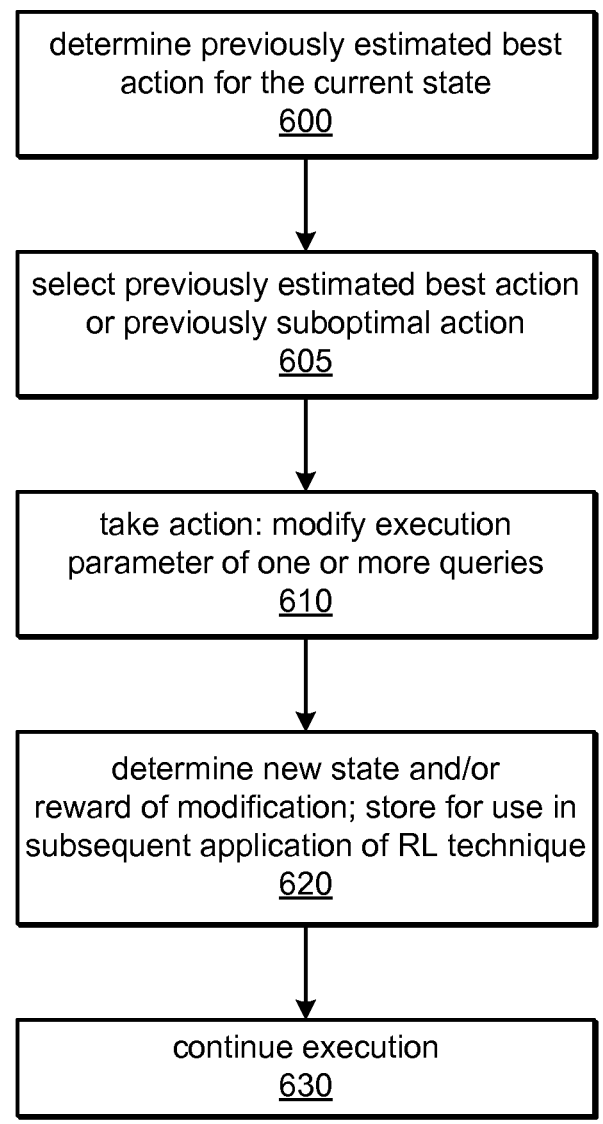
FIG. 6 is a flow chart illustrating one embodiment of a method for applying a reinforcement learning technique to resource isolation in a database service.

If it is determined that one or more of the queries are executing outside of the received SLA parameter values, shown as the negative exit from 550, the method may include applying a reinforcement learning technique in an attempt to correct the situation, as in 560. An example of such a technique is illustrated in FIG. 6 and described below. Once a correction has been attempted, the method may include continuing execution of the received queries, shown as the feedback loop to 540. Note that at any point during the execution of the method illustrated in FIG. 5, additional queries may be received and executed and/or additional subscriber accounts may be established. As any additional queries are received from new or existing subscribers and executed, the method may include performing the operations illustrated in elements 540-560 for these queries, as well. However, for clarity, these additional iterations of the method are not shown.

The application of reinforcement learning to resource isolation in a database service shown as 560 in FIG. 5 may be further illustrated by the flow chart in FIG. 6. In this example, it is assumed that the method is invoked in response to determining that the database service, or a portion thereof, is operating outside of one or more of the received SLA parameter values, as shown in FIG. 5. In this example, the method may include determining an action that was previously estimated to be the best action to take for the current state, as in 600. For example, in some embodiments, a Q(s, a) reward table may be consulted to determine the best action to take, based on the current policy. As illustrated in FIG. 6, the method may include selecting one of a plurality of available actions to take, as in 605. The available actions may include the previously estimated best action and one or more actions that were previously considered to be suboptimal. As described in more detailed herein, determining whether to select a previously estimated best action or an action that was previously considered to be suboptimal may in some embodiments be dependent on a learning rate and/or discount factor of the particular RL technique being applied.

The method may include taking the selected action, which may include modifying an execution parameter associated with one of the currently executing (or currently pending) queries, as in 610. For example, if it is determined that one of the currently executing queries is consuming more of the I/O capacity than its SLA parameter values specify, the action may include changing an execution parameter to delay execution of one or more queries. In another example, if it is determined that queries associated with a given subscriber, namespace, or query type are consuming more I/O capacity than their SLA parameter values specify, the action may include changing an execution parameter to insert a delay before accepting additional connections for the given subscriber, namespace, or query type, or to insert a delay between operations to fetch results of the associated queries. Note that a modified execution parameter may, in different embodiments, be associated with a particular subscriber, a particular client application, a particular query, a particular query type, or a particular query template. Note also that an execution parameter of one or more particular queries may be modified in an attempt to correct an inconsistency with global or local SLA parameter values, whether or not the particular query or queries for which an execution parameter is modified are executing outside of their associated SLA parameters. In other words, a modification to an execution parameter of a given subscriber, namespace, query, or application may correct an SLA inconsistency of a different subscriber, namespace, query, or application, or may correct a global SLA inconsistency, even if the given subscriber, namespace, query, or application was operating within its own limits prior to the modification.

Once an action has been taken, the method may include determining the new state of the database service and/or determining the reward associated with having taken the action, as in 620. For example, the IOPS of each of the currently executing requests may be determined. Using this information, a reward may be calculated for the action. In some embodiments, if the action improved the operation of the database service, with respect to the SLA parameter values, the reward may be represented by a positive number, but if the action caused the situation to deteriorate, the reward may be represented by a negative number.

As shown in 620, the new state and/or reward value may be stored for use in a subsequent application of the RL technique, e.g., in a subsequent iteration of the loop illustrated in FIG. 5. In some embodiments, a value in a Q(s, a) reward table corresponding to the current state and action taken may be updated to reflect the effect of the action before execution continues in 630.

If the action taken corrected the mismatch between the IOPS of the currently executing queries and the specified SLA parameter values, the method illustrated in FIG. 5 may continue to execute currently executing or pending queries, shown as the feedback loop from 560 to 540, without needing to invoke the RL mechanism again. If, on the other hand, the state of the database service is still inconsistent with the specified SLA parameter values, the method illustrated in FIG. 5 may include invoking the RL mechanism a second time so that a second action may be taken in an attempt to correct the situation.

The system and methods for applying reinforcement learning to resource isolation may be further illustrated by the following detailed example. This example illustrates the use of the SARSA algorithm, although other RL algorithms (e.g., a Q-learning technique, an Actor-Critic technique, an Adaptive Heuristic Critic technique, or any other reinforcement learning technique) may be applied in various embodiments. In this example, a database service may have three states and may have three actions available for modifying the state. In this example, the number of I/O operations associated with a namespace may be measured, and the amount of work done by a namespace may be controlled by delaying the issue of a query. In this example, three states are defined {LOW, MED, HIGH}, where the system is considered to be in the LOW state if the measured IOPS are less than minIOPS, it is considered to be in the HIGH state if the measured IOPS are greater than maxIOPS, or it is considered to be in the MED state otherwise. In this example, the three available actions are defined as {NO DELAY, SMALL DELAY, LARGE DELAY}, corresponding to no delay, a delay of 100 ms and a delay of 1000 ms, respectively. Therefore, in this example, the value table Q(s, a) may have nine possible values.

In this example, it is assumed that the best way to control the namespace is to execute using a LARGE DELAY when the measured IOPS correspond to the HIGH state, using a SMALL DELAY when the measured IOPS correspond to the MED state, and using NO DELAY when the measured IOPS correspond to the LOW state. However, the system may not have this knowledge when execution begins and must learn it. In this example, the value table, Q(s, a) is initialized with random values, as shown below in Table 1. In this example, the RL technique uses a learning rate, or alpha value, of $\alpha=1.0$, and a discount factor, or gamma value, of $\gamma=0.25$. In the SARSA algorithm, the learning rate (which may vary from 0 to 1) may determine how quickly learning occurs. For example, if the alpha value is 0, the value table will never be updated and the system cannot learn by exploring previously suboptimal actions. In the SARSA algorithm, the discount factor models the fact that future rewards may be less desirable than immediate rewards, and may be adjusted to allow more or fewer explorations of previously suboptimal actions.

TABLE 1

| | Q(s, a) - Initial values | | |
| --- | --- | --- | --- |
| | STATE | | |
| Action | LOW | MED | HIGH |
| NO DELAY | 0.3 | 0.2 | 0.3 |
| SMALL DELAY | 0.2 | 0.3 | 0.0 |
| LARGE DELAY | 0.1 | 0.1 | 0.1 |

In this example, at each sampling period, the throttler measures the amount of I/O done by the namespace. If the namespace is currently in the HIGH state, it is performing a large number of I/O operations. Since, the state/action pair (HIGH, NO DELAY) was initialized to 0.3, NO DELAY appears to be the highest value action to take for the HIGH state, and the throttler decides to not delay operations directed to the namespace. For example, in one embodiment this action may include setting (or resetting) an execution parameter associated with the namespace (or a database application accessing the namespace) to a value of 0. Additional measurements following this action indicate that the situation is not improved and the system remains in the HIGH state. Since the situation is not improved, the throttler receives a low reward of −1.0 in response to its first action. In this example, the value table may be updated according to the formula, Q(s, a)←Q(s, a)+α[r+γQ(s', a')−Q(s, a)]. Note that in this formula, the value Q(s', a') corresponds to the current value associated with the new state (still HIGH), which is the pair Q(HIGH, NO DELAY)=0.3. In this case, the Q(HIGH, NO DELAY) value is updated to reflect the effect of the first action as follows: Q(HIGH, NO DELAY)=0.3+(1.0)[−1.0+0.25*0.3−0.3)]=−0.925. The updated value table is shown below in Table 2. In this example, the negative feedback from taking an incorrect action corrects the value table.

TABLE 2

Q(s, a) - After first action

| Action | STATE | | |
|---|---|---|---|
| | LOW | MED | HIGH |
| NO DELAY | 0.3 | 0.2 | −0.925 |
| SMALL DELAY | 0.2 | 0.3 | 0.0 |
| LARGE DELAY | 0.1 | 0.1 | 0.1 |

Following the first application of the SARSA algorithm, the value table indicates that the highest value action to take when the state of the system is HIGH, is LARGE DELAY, with a value of 0.1. Therefore, the next time the throttler is called, it decides to delay operations associated with the namespace using a LARGE DELAY. Again, in one embodiment, this action may be implemented by changing the value of an execution parameter associated with the namespace or a client application. In this example, this is the correct action to take when the namespace is in the HIGH state. In fact, measurements following this second action indicate that, as a result of the action, the namespace goes to state MED, as desired. Thus, the throttler receives a high reward value, 1.0. The formula $Q(s, a) \leftarrow Q(s, a) + \alpha[r + \gamma Q(s', a') - Q(s, a)]$ is used to update the value associated with the (HIGH, LARGE DELAY) pair to reflect the effect of the second action. Note that in this formula, the value $Q(s', a')$ corresponds to the current value associated with the new state, i.e., the pair Q(MED, SMALL DELAY)=0.3. The value table is updated for the second action as follows: Q(HIGH, LARGE DELAY)=0.1+(1.0)[1.0+0.25*0.3−0.1)]=1.075. This is reflected in Table 3, below. As this example shows, the learning procedure is iterative and through experiences, the throttler learns the correct actions over time.

TABLE 3

Q(s, a) - After second action

| Action | STATE | | |
|---|---|---|---|
| | LOW | MED | HIGH |
| NO DELAY | 0.3 | 0.2 | −0.925 |
| SMALL DELAY | 0.2 | 0.3 | 0.0 |
| LARGE DELAY | 0.1 | 0.1 | 1.075 |

Note that the next time the throttler is called, based on the policy reflected in Table 3, the throttler would select the SMALL DELAY action, assuming the system is still in the MED state. This is because the (MED, SMALL DELAY) pair is associated with the highest value in Table 3 for the MED state.

Figure 7A:
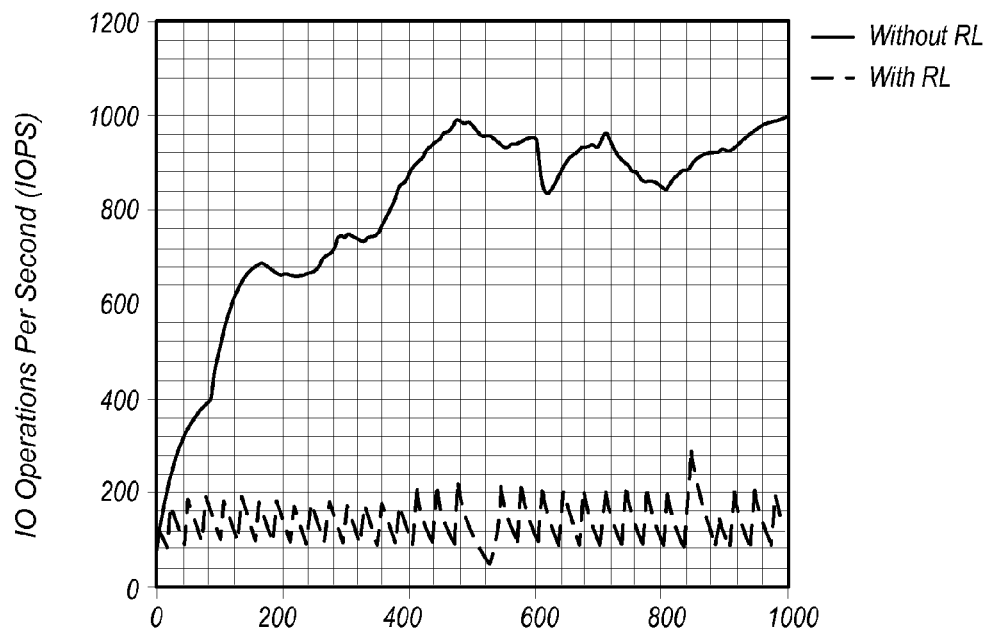
FIGS. 7A-7C are resource utilization graphs illustrating one example of the use of resource isolation in a database service, according to one embodiment.
Figure 7B:
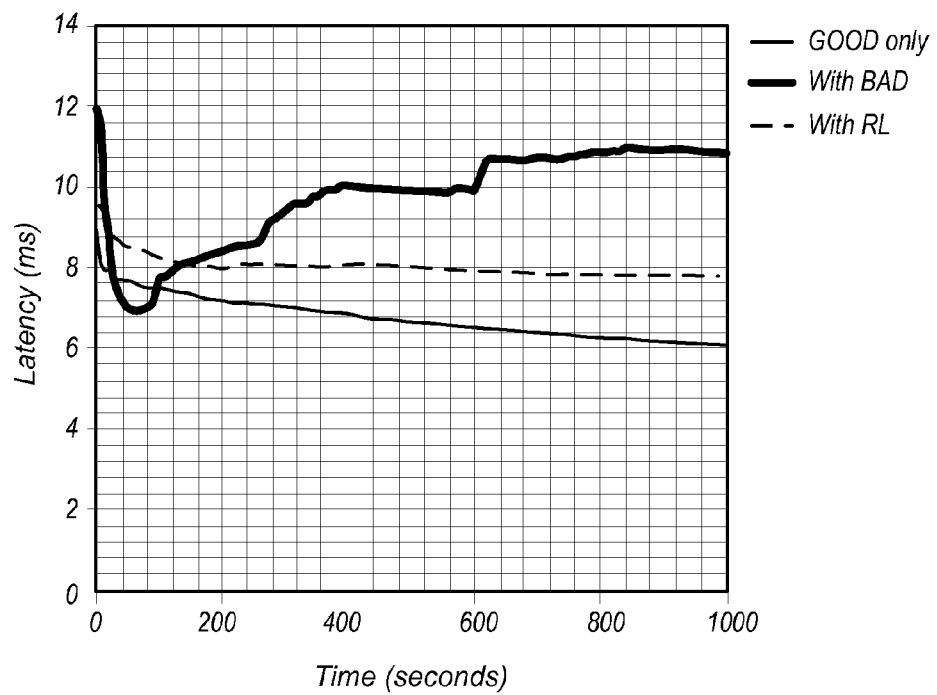
Figure 7C:
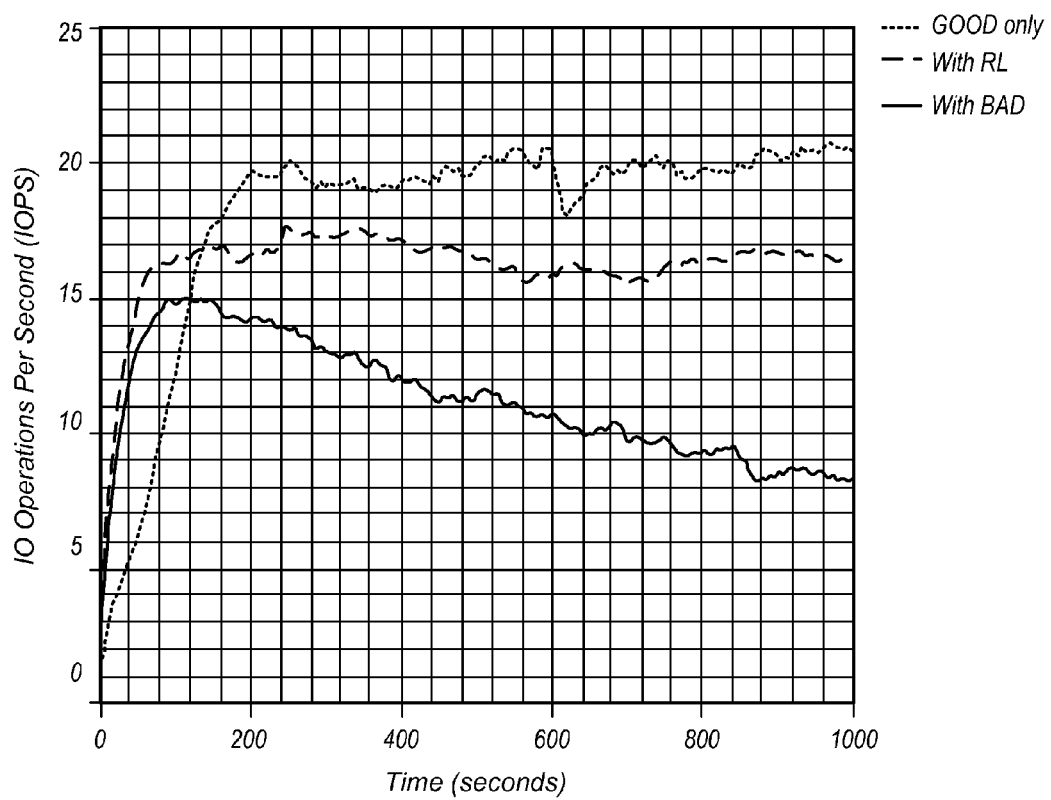
Figure 8:
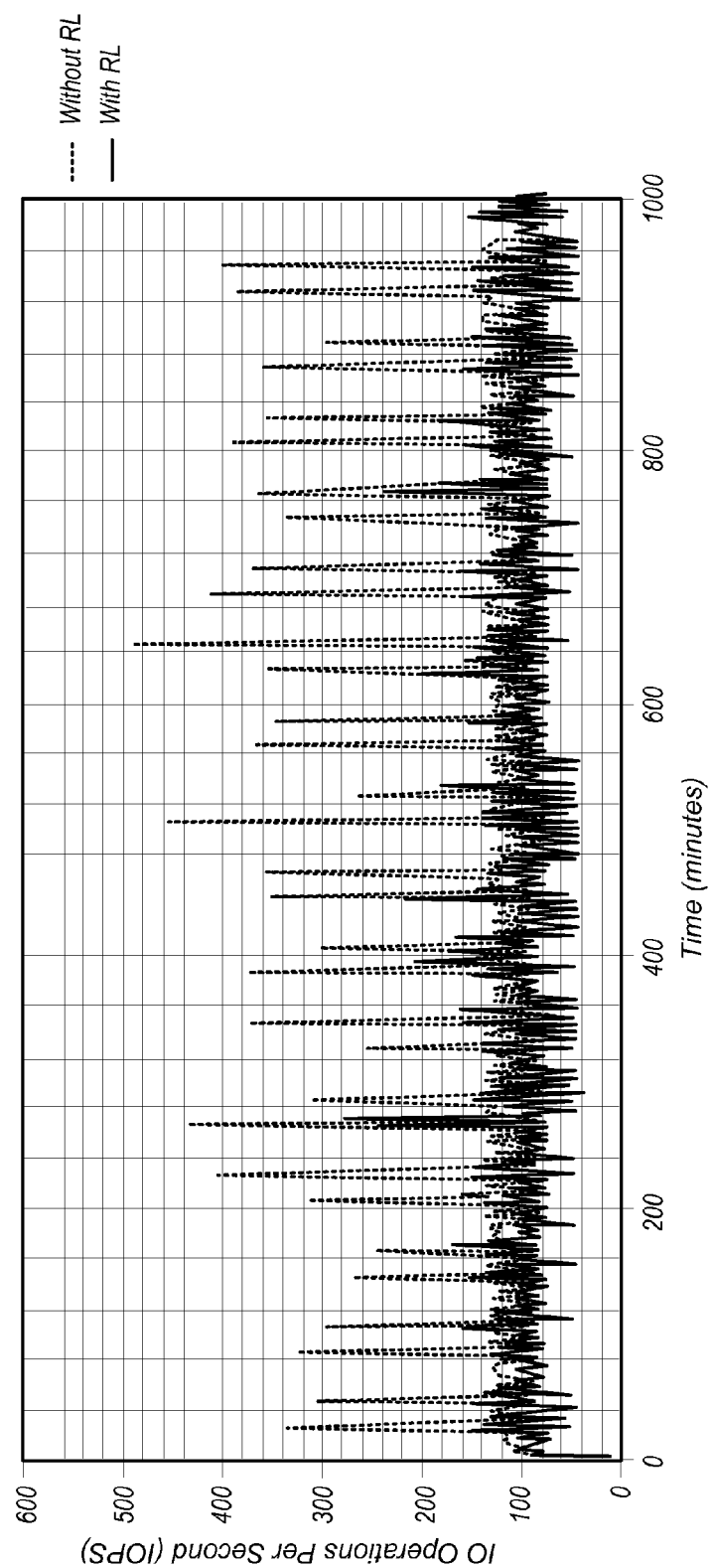
FIG. 8 is a resource utilization graph illustrating another example of the use of resource isolation in a database service, according to one embodiment.

The performance of reinforcement learning techniques in resource isolation may be evaluated by way of experimentation. FIGS. 7A-7C illustrate the results of one such experiment, and FIG. 8 illustrates the results of a second experiment. In the first experiment, two different namespaces were hosted in a single database. Both namespaces were allocated a quota of 100 IOPS. In this experiment, clients of one of the namespaces (henceforth, BAD) execute expensive queries (e.g., full table scans and range queries) that constantly require more than 200 IOPS. Clients of the other namespace (henceforth, GOOD) execute small queries that require fewer than 50 IOPS. In this scenario, without the use of a resource isolation algorithm, as expected, the BAD namespace monopolized many of the system resources, and its I/O utilization increased to 900 IOPS, well above its quota of 100 IOPS. This behavior is illustrated in FIG. 7A. In FIG. 7A, the solid (upper) line represents the IOPS of the BAD namespace over time without the application of resource isolation using RL techniques, and the dashed (lower) line represents the IOPS of the BAD namespace over time with the application of resource isolation using RL techniques. In this example, it can be seen that the BAD IOPS are limited to approximately 100 IOPS, as desired, when RL techniques are applied.

In this experiment, the behavior of the BAD namespace affected the latency of the GOOD namespace. This is illustrated in FIG. 7B. In FIG. 7B, the stand-alone latency of the GOOD namespace, i.e., when operating without the BAD namespace and absent of the resource isolation techniques described herein, is represented by the thin, solid (lowest) line. When the BAD namespace is operating, the latency of the GOOD namespace increases dramatically, as shown by the thick, solid (uppermost) line. However, with the use of the isolation techniques described herein, the latency of the GOOD namespace decreased (shown as the middle, dashed line in FIG. 7B). This experiment illustrates the effectiveness of the resource isolation techniques described herein. FIG. 7C illustrates the change in the IOPS for the GOOD namespace in this experiment. In FIG. 7C, the IOPS for the GOOD namespace when operating without the BAD namespace and absent of the resource isolation techniques described herein, are represented by the dotted (uppermost) line, the IOPS for the GOOD namespace when operating along with the BAD namespace but absent of the resource isolation techniques are represented by the solid (lowest) line, and the IOPS for the GOOD namespace when operating with the BAD namespace and with the application of the resource isolation techniques are represented by the dashed (middle) line. Again, this experiment shows that the techniques described herein may be effective in isolating the resource utilization of one namespace from the effects of the resource utilization of another namespace.

In a second experiment, two different namespaces were again hosted in a single physical database server. Both namespaces were allocated a quota of 100 IOPS. Similar to the previous experiment, there was a BAD namespace and a GOOD namespace. However, in this experiment, clients of the BAD namespace usually execute simple queries, but produce a request spike (i.e., a sudden increase in request rate), in which their request rate increases by 25 times, once per hour. The I/O utilization and latency of these namespaces was evaluated with and without the use of the isolation techniques described herein for a period of 18 hours. A portion of the results of this experiment is illustrated in FIG. 8. This figure illustrates the effects of the resource isolation techniques described herein on the IOPS of the BAD namespace. In this figure, the dotted line represents the IOPS of the BAD namespace without the use of the reinforcement learning techniques described herein. As seen in FIG. 8, the IOPS associated with the BAD namespace increased during the spikes, with the I/O utilization reaching more than 400 IOPS, in some cases. However, as illustrated by the solid line in the figure, with the use of the resource isolation technique described herein, the IOPS of the BAD namespace during such a spike were limited to 120 IOPS. This second experiment illustrates that the resource isolation technique described herein may be capable not only of limiting a constant high load (as demonstrated in the previous experiment), but may also be effective in limiting the effects of a temporary increase in I/O workload.

Note that the resource isolation techniques described herein may in some embodiments include a mechanism to allow more frequent exploration of actions and corresponding feedback to the system in initial phases of execution, and to limit the effects of the RL technique as the values converge to their optimum state. Such a mechanism may allow the system to choose the historically best actions most of the time, once the values have converged on an acceptable policy, but also to react to changes that make other actions better in the future (e.g., due to a change in capacity, workload, etc). For example, in one embodiment, the reinforcement learning technique used in resource isolation may employ an exponential decaying of the discount factor, $\gamma$. As noted earlier, the agent may choose to execute a random action (which may be suboptimal) with a probability $1-\gamma$. This may affect the performance of the system in the short term, as the random action may not be the best action to take. On the other hand, setting $\gamma$ to be 1 discourages (prevents) the system from exploring new actions. In this case, a globally optimum action may not be attempted, even though it may have been found if the system had done more exploration. To address this dilemma, an exponential decay function may be applied to $\gamma$, in which the $1-\gamma$ value starts with a high value (e.g., 0.1), and decreases over time. For example, in one embodiment, the $1-\gamma$ value may be reduced by 50% periodically (e.g., every 8 hours), to 0.05, 0.025, and so on, until it reaches a low threshold, defined as $1-\gamma_{low}$. Using this optimization, the system may explore random actions aggressively in the beginning and then may stabilize as it learns a large number of actions. Note that this process of decaying may in some embodiments be implemented based on the number of actions (e.g., wherein the $1-\gamma$ value is decreased every 100,000 actions) instead of time.

As previously noted, the resource isolation techniques described above may be applied to global optimization of resources or to local optimizations for different subsets of operations, in different embodiments. For example, a particular value table, as described herein, may be associated with a given subscriber or namespace, in some embodiments. If actions and rewards are observed at the overall system level, the subscriber level, or the namespace level, they may not take into account the nature of the various queries being throttled. In some embodiments, an expensive query may be throttled in the same way as a simple query, if they arrive at the same time. In other embodiments, a reward function may be maintained for each query template and the resource isolation techniques may be executed separately for each query template. In other words, the resource isolation techniques described herein may be applied separately to queries of a given type. For example, a value table and agent may be associated with each of several query templates. Thus, an agent (i.e., a throttler) may be executed for each query template. In some embodiments, a query template may be a parameterized SQL query whose parameter values are passed to the system at runtime. One example of a query template is the following template: "select*from items where price<?". Such a template would be called by an application and the parameter values to fill in the template and complete the query may be passed to the system when the template is called. Typically, a database-driven Web application may execute queries that are instances of tens of such query templates with dynamically changing parameter values (e.g., derived from user inputs). Maintaining a reward function for each query template and executing the agent for each query template may be an effective way to manage resource isolation in dynamically changing environments. In some embodiments, a combination of global and local resource isolation techniques may be applied, each including a reward function (e.g., a value table) and an agent (e.g., a throttler).

The methods described herein for implementing resource isolation using RL techniques may be implemented on a wide variety of shared computing systems using any number of underlying system configurations and/or data storage architectures, in different embodiments. For example, in some embodiments, a database service or other shared computing service may be configured to run on one or more computing nodes coupled to each other through wired and/or wireless interfaces according to one or more standard communication protocols. The components making up such a system (e.g., client libraries 440, administrative servers 410, gateway processes 450, database servers 430, subscriber applications 140, shared computing resources 130, or other components configured to implement the functionality of these components as described herein), may be resident on a single computing node or may be distributed across multiple nodes, whether in a single location or in multiple data centers (sites), in different embodiments. A shared storage service, e.g., a database service, may in some embodiments be implemented in a computing system that includes an extensible and highly available data processing platform that combines data storage and grid computing capabilities. In one such embodiment, a distributed data storage system underlying such a service may include a set of clusters that implement a high-availability database, such as Berkeley DB HA. A computer system that provides resource isolation in a shared computing environment may interact with client applications and/or with users (subscribers) through a web interface, such as a web services application, in some embodiments. Such an interface may be included in a client library 440, in some embodiments, or may be provided by functionality included in administrative server 410.

Note also that while various resource isolation techniques have been described in many of the examples herein in terms of their application to a shared storage system and/or a database service, these techniques may in other embodiments be applied to resource isolation in any shared computing environment, including, but not limited to, shared file systems, compute clusters, server farms, cloud computing environments, remote financial services applications or payment services, or shared messaging services. For example, reinforcement learning techniques may be applied in these shared computing environments to manage allocation of CPU, memory, and/or I/O resources, and to isolate those resources in much the same manner as described herein. In general, in these and other shared computing environments, service level agreement parameter values may be specified for users or subscribers, applications, workload types, or particular workloads in a shared computing environment and resource utilization may be monitored for compliance to those parameter values. Whenever the shared computing environment is found to be operating outside of those parameter values, a throttler may automatically apply a SARSA algorithm or another RL technique to one or more service requests to attempt to correct the situation, and may learn the most effective corrective actions to take over time.

Figure 9:
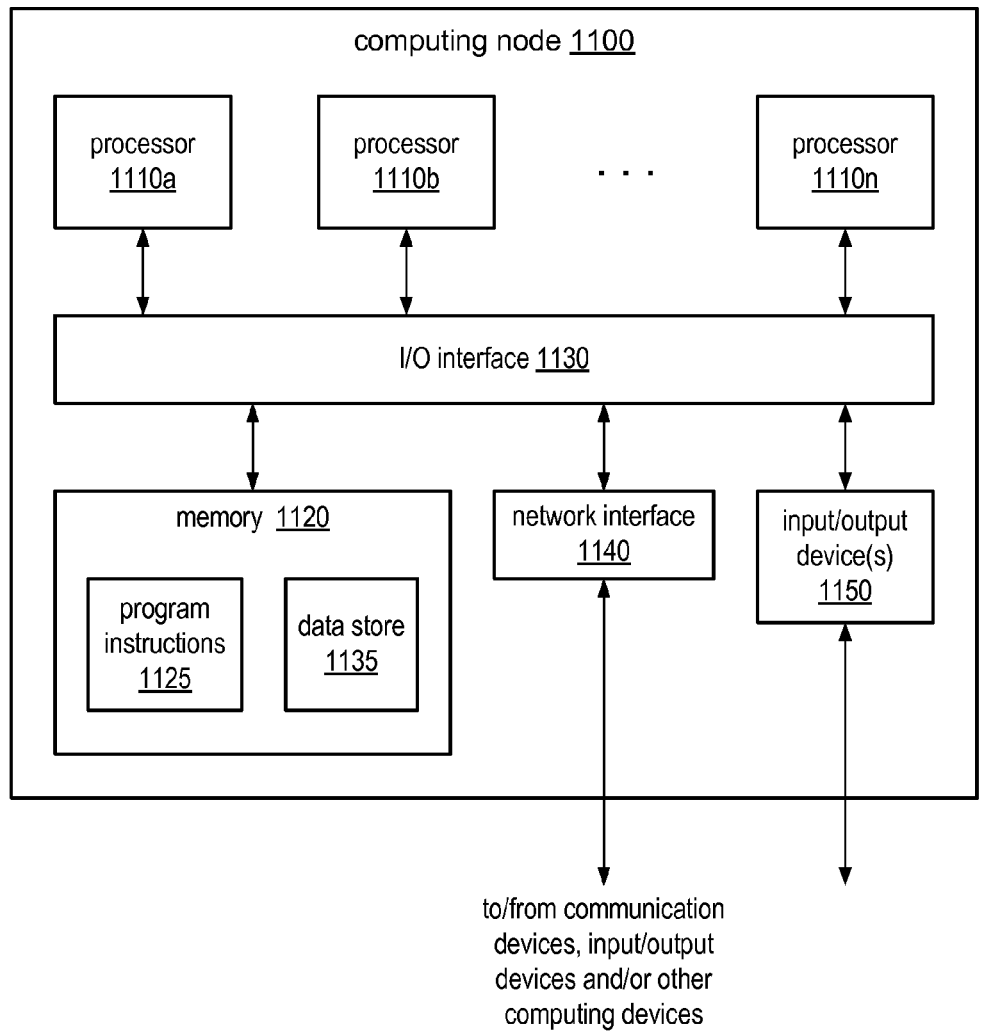
FIG. 9 is a block diagram illustrating one embodiment of a computing node suitable for implementing resource isolation using reinforcement learning.

One computing node that may be suitable for implementation of resource isolation through the use of RL techniques is illustrated in FIG. 9. As noted above, computing node 1100 may include functionality to provide any or all of the components of a shared computing system described herein, or multiple computing nodes similar to or different from computing node 1100 may collectively provide this functionality, in different embodiments. For example, in one embodiment, one or more computing nodes 1100 that implement client application servers 420 may also be configured to provide client libraries 440, while in other embodiments, one or more computing nodes 1100 configured to provide administrative servers 410 may also provide client libraries 440. In still other embodiments, client libraries 440 may be provided by one or more other computing nodes 1100 configured to implement a middle tier between application servers 120 or 420 and administrative servers 410. Similarly, gateway processes 450 may be provided by one or more computing nodes configured to implement shared computing resources 130 or database servers 430, or by one or more computing nodes configured to implement administrative servers 410. In some embodiments that include multiple computing nodes 1100, all of the computing nodes 1100 may include the same or similar hardware components, software components, and functionality, while in other embodiments, the computing nodes 1100 comprising a computing system configured to implement the functionality described herein may include a wide variety of hardware components, software components, and functionality. Note that while FIG. 4 illustrates an embodiment in which each client library 440 is associated with a single application server 420, and each gateway 450 is associated with a single database server 430, in other embodiments, these components may have mappings other than this one-to-one correspondence, as described herein.

In the illustrated embodiment, computing node 1100 includes one or more processors 1110 coupled to a system memory 1120 via an input/output (I/O) interface 1130. Computing node 1100 further includes a network interface 1140 coupled to I/O interface 1130, and one or more input/output devices 1150. As noted above, in some embodiments, a given node may implement the functionality of more than one component of a shared computing environment providing resource isolation, as described herein. In various embodiments a computing node 1100 may be a uniprocessor system including one processor 1110, or a multiprocessor system including several processors 1110 (e.g., two, four, eight, or another suitable number). Processors 1110 may be any suitable processor capable of executing instructions. For example, in various embodiments processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA. Similarly, in a distributed computing system such as that described herein, each of the computing nodes may implement the same ISA, or individual nodes and/or replica groups of nodes may implement different ISAs.

System memory 1120 may be configured to store program instructions and/or data accessible by processor 1110. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 1120 as program instructions 1125 and data storage 1135, respectively. For example, program instruction 1125 may include any or all of an administrative server process (e.g., administrative server 410), a user interface, a web services interface, a load-balancing service, a database server (e.g., database server 430), a distributed database, a gateway process (e.g., gateway 450), a client library (e.g., client library 440), an application server (e.g., application server 420), a subscriber application 140, or an agent configured to implement resource isolation (e.g., a throttler). Program instructions 1125 may also include program instructions configured to implement additional functionality of a shared computing system not described herein.

Data storage 1135 may in various embodiments include collections of data maintained by a shared storage system or database service, and/or metadata used by a shared computing system, as described herein (including, but not limited to, partition maps, routing tables, indexes, namespaces and/or partitions thereof, database schemas, service level agreement parameter values, subscriber preferences and account information, performance data, resource usage data, and value tables $Q(s, a)$). In other embodiments, program instructions and/or data as described herein for implementing resource isolation using RL techniques may be received, sent or stored upon different types of computer-readable media or on similar media separate from system memory 1120 or computing node 1100. Generally speaking, a computer-readable medium may include storage media or memory media such as magnetic or optical media, e.g., disk or CD/DVD-ROM coupled to computing node 1100 via I/O interface 1130. Program instructions and data stored on a computer-readable storage medium may be transmitted to a computing node 1100 for execution by a processor 1110$a$ by transmission media or signals such as electrical, electromagnetic, or digital signals, which may be conveyed via a communication medium such as a network and/or a wireless link, such as may be implemented via network interface 1140.

In one embodiment, I/O interface 1130 may be configured to coordinate I/O traffic between processor 1110, system memory 1120, and any peripheral devices in the computing node, including network interface 1140 or other peripheral interfaces, such as input/output devices 1150. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computing node 1100 and other devices attached to a network, such as other computer systems, or between other nodes in a system providing shared computing services. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1150 may, in some embodiments, include one or more display terminals, keyboards, keypads, touchpads, scanning devices, voice or optical recognition devices, or any other devices suitable for entering or retrieving data by one or more computing nodes 1100. Multiple input/output devices 1150 may be present in computing node 1100 or may be distributed on various nodes of a shared resource system or grid computing system. In some embodiments, similar input/output devices may be separate from computing node 1100 and may interact with one or more nodes of a shared resource system through a wired or wireless connection, such as over network interface 1140.

Users may interact with a shared computing service (e.g., a shared storage system or database service) in various ways in different embodiments, such as to submit requests for service, query requests, and/or metrics requests, and to receive results. For example, some subscribers to the service may have physical access to computing node 1100, and if so, may interact with various input/output devices 1150 to provide and/or receive information. Alternatively, other users may use client computing systems to access the system, such as remotely via network interface 1140 (e.g., via the Internet and/or the World Wide Web). In addition, some or all of the computing nodes of a system providing the service may provide various feedback or other general types of information to users (e.g., in response to user requests) via one or more input/output devices 1150.

Those skilled in the art will appreciate that computing node 1100 is merely illustrative and is not intended to limit the scope of embodiments. In particular, the computing system and devices may include any combination of hardware or software that can perform the indicated functions, including computers, network devices, internet appliances, PDAs, wireless phones, pagers, etc. Computing node 1100 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system via inter-computer communication. Some or all of the system components or data structures may also be stored (e.g., as instructions or structured data) on a computer-readable storage medium or a portable article to be read by an appropriate drive, various examples of which are described above. In some embodiments, instructions stored on a computer-readable storage medium separate from computing node 1100 may be transmitted to computing node 1100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-readable storage medium. Accordingly, different embodiments may be practiced with other computer system configurations.

Those skilled in the art will appreciate that in some embodiments the functionality provided by the methods discussed above may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

From the foregoing it will be appreciated that, although specific embodiments have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
   performing, by a computer:
   storing data on behalf of a plurality of subscribers in a shared storage system;
   receiving input specifying one or more service level parameter values, each parameter value specifying a quantity of a respective resource that can be allocated for use in executing one or more queries in the shared storage system;
   receiving a plurality of queries directed to the data; and
   executing the plurality of queries, wherein said executing comprises:
   monitoring resource utilization, wherein the monitored resource utilization is resource utilization by the plurality of queries of resources for which service level parameter values have been specified, wherein said monitoring is performed during execution of the plurality of queries;
   determining whether the resource utilization by the plurality of queries is consistent with the one or more specified service level parameter values; and
   in response to determining that the resource utilization by one or more of the plurality of queries is not consistent with the one or more specified service level parameter values, attempting to correct the determined inconsistency, wherein said attempting comprises applying a reinforcement learning technique to automatically update an execution parameter of at least one of the plurality of queries, wherein an execution parameter is a modifiable parameter affecting execution of the plurality of queries, and wherein the update is performed during execution of the plurality of queries.

2. The method of claim 1, wherein said applying a reinforcement learning technique comprises selecting an action from among a plurality of available actions, wherein each action comprises a specified update to a given execution parameter.

3. The method of claim 2, wherein said selecting comprises selecting an action dependent on a previously determined reward value associated with the action.

4. The method of claim 1, wherein said applying a reinforcement learning technique comprises selecting a previously estimated best action from among a plurality of available actions, wherein said best action comprises a specified update to a given execution parameter.

5. The method of claim 1, wherein said applying a reinforcement learning technique comprises selecting a previously estimated suboptimal action from among a plurality of available actions, wherein said suboptimal action comprises a specified update to a given execution parameter.

6. The method of claim 1, wherein said executing further comprises, in response to said updating an execution parameter:
determining a reward value of said update; and
modifying a previously estimated reward value of said update;
wherein the modified reward value is usable in selecting one of a plurality of available actions in a subsequent application of the reinforcement learning technique; and
wherein each of the plurality of actions comprises a specified update to a given execution parameter.

7. The method of claim 1, wherein the one or more service level parameter values specify one or more of: a quantity of input/output resources, a rate of input/output operations, a quantity of CPU resources, a rate of utilization of CPU resources, a number of connections to the shared storage system, an amount of storage memory, an amount of execution memory, or a latency value.

8. The method of claim 1, wherein the one or more service level parameter values specify one or more of: a maximum quantity of a resource, a minimum quantity of a resource, or a guaranteed quantity of a resource.

9. The method of claim 1, wherein the execution parameter comprises a delay before opening a connection to the shared storage system, a delay before executing a query, a delay when fetching results of a query, a limit on a number of connections, an assignment of a CPU resource to a query, an allocation of execution memory to a query, or a limit on a number of queries accepted.

10. The method of claim 1, wherein the reinforcement learning technique comprises a State-Action-Reward-State-Action technique, a Q-learning technique, an Actor-Critic technique, or an Adaptive Heuristic Critic technique.

11. The method of claim 1, wherein said monitoring and said determining are performed in the context of the shared storage system as a whole.

12. The method of claim 1, wherein said monitoring and said determining are performed in the context of a given subscriber, a given namespace, a given client application, a given query, a given query type, or a given query template.

13. The method of claim 1, wherein said monitoring comprises determining one or more of a query request rate, a query execution rate, a query type, an input/output resource utilization rate, an input/output resource utilization trend, an input/output operation rate, an input/output operation trend, a CPU utilization, a CPU utilization trend, a connection request rate, a current number of connections, storage memory usage, a storage memory usage trend, execution memory usage, an execution memory trend, a query return data volume, or a query return data volume trend.

14. The method of claim 1, wherein said monitoring is repeated on a periodic basis during said executing the plurality of queries.

15. The method of claim 1, wherein said updating an execution parameter comprises updating an execution parameter associated with a given one of the plurality of subscribers, a given namespace, a given client application, a given query, a given query type, or a given query template.

16. The method of claim 1, wherein said updating an execution parameter comprises updating a global execution parameter of the shared storage system.

17. The method of claim 1, wherein each parameter value specifies a quantity of a resource to be allocated to a given one of the plurality of subscribers, a given namespace, a given client application, a given query, queries of a given query type, or queries associated with a given query template.

18. A computing system, comprising:
one or more computing nodes, wherein each of the one or more computing nodes comprises at least one processor and a memory, and wherein the one or more computing nodes are configured to collectively implement a database service, wherein the database service is configured to:
store data on behalf of a plurality of subscribers to the database service;
receive input specifying one or more service level parameter values, each parameter value specifying a quantity of a respective resource that can be allocated for use in executing one or more queries by the database service;
receive a plurality of queries directed to the data; and
execute the plurality of queries, wherein to execute the plurality of queries, the database service is further configured to:
monitor resource utilization, wherein the monitored resource utilization is resource utilization by the plurality of queries of resources for which service level parameter values have been specified, wherein said monitoring is performed during execution of the plurality of queries;
determine whether the resource utilization by the plurality of queries is consistent with the one or more specified service level parameter values; and
in response to determining that the resource utilization by one or more of the plurality of queries is not consistent with the one or more specified service level parameter values, attempt to correct the determined inconsistency, wherein to attempt to correct the determined inconsistency, the database service is configured to apply a reinforcement learning technique to automatically update an execution parameter of at least one of the plurality of queries, wherein an execution parameter is a modifiable parameter affecting execution of the plurality of queries, and wherein the update is performed during execution of the plurality of queries.

19. The system of claim 18, wherein to apply a reinforcement learning technique, the database service is further configured to select an action from among a plurality of available actions dependent on a previously determined reward value associated with the action, wherein each action comprises a specified update to a given execution parameter.

20. The system of claim 19, wherein said selecting comprises selecting, dependent on a specified learning rate or a specified discount factor, one of: a previously estimated best action or a previously estimated suboptimal action.

21. The system of claim 18, wherein to execute the plurality of queries, the database service is further configured to, in response to said updating an execution parameter:
determine a reward value of said update; and
modify a previously estimated reward value of said update;
wherein the modified reward value is usable in selecting one of a plurality of available actions in a subsequent application of the reinforcement learning technique; and
wherein each of the plurality of actions comprises a specified update to a given execution parameter.

22. The system of claim 18,
wherein the one or more service level parameter values specify one or more of: a quantity of input/output resources, a rate of input/output operations, a quantity of CPU resources, a rate of utilization of CPU resources, a number of connections to the database service, an amount of storage memory, an amount of execution memory, or a latency value; and
wherein the one or more service level parameter values specify one or more of: a maximum quantity of a resource, a minimum quantity of a resource, or a guaranteed quantity of a resource.

23. The system of claim 18, wherein the execution parameter comprises a delay before opening a connection to the database service, a delay before executing a query, a delay when fetching results of a query, a limit on a number of connections, an assignment of a CPU resource to a query, an allocation of execution memory to a query, or a limit on a number of queries accepted.

24. The system of claim 18,
wherein said monitoring and said determining are performed in the context of the database service as a whole; and
wherein to update an execution parameter, the database service is further configured to update a global execution parameter of the database service.

25. The system of claim 18,
wherein said monitoring and said determining are performed in the context of a given subscriber, a given namespace, a given client application, a given query, a given query type, or a given query template; and
wherein to update an execution parameter, the database service is further configured to update an execution parameter associated with a given one of the plurality of subscribers, a given namespace, a given client application, a given query, a given query type, or a given query template.

26. The system of claim 18, wherein the database service is further configured to repeat said monitoring on a periodic basis during said executing the plurality of queries.

27. The system of claim 18, wherein each parameter value specifies a quantity of a resource to be allocated to a given one of the plurality of subscribers, a given namespace, a given client application, a given query, queries of a given query type, or queries associated with a given query template.

28. A computing system, comprising:
one or more processors; and
a memory coupled to the one or more processors and configured to implement a shared storage system;
wherein the memory is further configured to store program instructions executable by the one or more processors to implement:
storing data in the shared storage system on behalf of a plurality of subscribers;
receiving input specifying one or more service level parameter values, each parameter value specifying a quantity of a respective resource that can be allocated for use in executing one or more queries in the shared storage system;
receiving a plurality of queries directed to the data; and
executing the plurality of queries, wherein to execute the plurality of queries, the program instructions are further executable to implement:
monitoring resource utilization, wherein the monitored resource utilization is resource utilization by the plurality of queries of resources for which service level parameter values have been specified, wherein said monitoring is performed during execution of the plurality of queries;
determining whether the resource utilization by the plurality of queries is consistent with the one or more specified service level parameter values; and
in response to determining that the resource utilization by one or more of the plurality of queries is not consistent with the one or more specified service level parameter values, attempting to correct the determined inconsistency, wherein said attempting comprises applying a reinforcement learning technique to automatically update an execution parameter of at least one of the plurality of queries, wherein an execution parameter is a modifiable parameter affecting execution of the plurality of queries, and wherein the update is performed during execution of the plurality of queries.

29. The system of claim 28, wherein said applying comprises selecting an action from among a plurality of available actions dependent on a previously determined reward value associated with the action, wherein each action comprises a specified update to a given execution parameter.

30. The system of claim 28, wherein said executing further comprises, in response to said updating an execution parameter:
determining a reward value of said update; and
modifying a previously estimated reward value of said update;
wherein the modified reward value is usable in selecting one of a plurality of available actions in a subsequent application of the reinforcement learning technique; and
wherein each of the plurality of actions comprises a specified update to a given execution parameter.

31. The system of claim 28,
wherein the one or more service level parameter values specify one or more of: a quantity of input/output resources, a rate of input/output operations, a quantity of CPU resources, a rate of utilization of CPU resources, a number of connections to the shared storage system, an amount of storage memory, an amount of execution memory, or a latency value; and
wherein the one or more service level parameter values specify one or more of: a maximum quantity of a resource, a minimum quantity of a resource, or a guaranteed quantity of a resource.

32. The system of claim 28, wherein the execution parameter comprises a delay before opening a connection to the shared storage system, a delay before executing a query, a delay when fetching results of a query, a limit on a number of connections, an assignment of a CPU resource to a query, an allocation of execution memory to a query, or a limit on a number of queries accepted.

33. The system of claim 28, wherein each parameter value specifies a quantity of a resource to be allocated to a given one of the plurality of subscribers, a given namespace, a given client application, a given query, queries of a given query type, or queries associated with a given query template.

34. A non-transitory, computer-readable storage medium storing program instructions computer-executable to implement:
  storing data in a shared storage system on behalf of a plurality of subscribers;
  receiving input specifying one or more service level parameter values, each parameter value specifying a quantity of a respective resource that can be allocated for use in executing one or more queries in the shared storage system;
  receiving a plurality of queries directed to the data; and
  executing the plurality of queries, wherein to execute the plurality of queries, the program instructions are further computer-executable to implement:
    monitoring resource utilization, wherein the monitored resource utilization is resource utilization by the plurality of queries of resources for which service level parameter values have been specified, wherein said monitoring is performed during execution of the plurality of queries;
    determining whether the resource utilization by the plurality of queries is consistent with the one or more specified service level parameter values; and
    in response to determining that the resource utilization by one or more of the plurality of queries is not consistent with the one or more specified service level parameter values, attempting to correct the determined inconsistency, wherein said attempting comprises applying a reinforcement learning technique to automatically update an execution parameter of at least one of the plurality of queries, wherein an execution parameter is a modifiable parameter affecting execution of the plurality of queries, and wherein the update is performed during execution of the plurality of queries.

35. The non-transitory, computer-readable storage medium of claim 34, wherein said applying comprises selecting an action from among a plurality of available actions dependent on a previously determined reward value associated with the action, wherein each action comprises a specified update to a given execution parameter.

36. The non-transitory, computer-readable storage medium of claim 34, wherein said executing further comprises, in response to said updating an execution parameter:
  determining a reward value of said update; and
  modifying a previously estimated reward value of said update;
  wherein the modified reward value is usable in selecting one of a plurality of available actions in a subsequent application of the reinforcement learning technique; and
  wherein each of the plurality of actions comprises a specified update to a given execution parameter.

37. The non-transitory, computer-readable storage medium of claim 34,
  wherein the one or more service level parameter values specify one or more of: a quantity of input/output resources, a rate of input/output operations, a quantity of CPU resources, a rate of utilization of CPU resources, a number of connections to the shared storage system, an amount of storage memory, an amount of execution memory, or a latency value; and
  wherein the one or more service level parameter values specify one or more of: a maximum quantity of a resource, a minimum quantity of a resource, or a guaranteed quantity of a resource.

38. The non-transitory, computer-readable storage medium of claim 34, wherein the execution parameter comprises a delay before opening a connection to the shared storage system, a delay before executing a query, a delay when fetching results of a query, a limit on a number of connections, an assignment of a CPU resource to a query, an allocation of execution memory to a query, or a limit on a number of queries accepted.

39. The non-transitory, computer-readable storage medium of claim 34, wherein each parameter value specifies a quantity of a resource to be allocated to a given one of the plurality of subscribers, a given namespace, a given client application, a given query, queries of a given query type, or queries associated with a given query template.

40. A computer-implemented method for providing computing services on behalf of a plurality of subscribers in a shared computing system, comprising:
  receiving input specifying one or more service level parameter values, each parameter value specifying a quantity of a respective resource of the shared computing system that can be allocated to a given one of the plurality of subscribers for use in executing one or more computing requests;
  receiving a plurality of computing requests; and
  executing the plurality of computing requests, wherein said executing comprises:
    monitoring resource utilization, wherein the monitored resource utilization is resource utilization by the plurality of computing requests of resources for which service level parameter values have been specified, wherein said monitoring is performed during execution of the plurality of computing requests;
    determining whether the resource utilization by the plurality of computing requests is consistent with the one or more specified service level parameter values;
    in response to determining that the resource utilization by one or more of the plurality of queries is not consistent with the one or more specified service level parameter values, attempting to correct the determined inconsistency, wherein said attempting comprises:
      applying a reinforcement learning technique to automatically update an execution parameter of at least one of the plurality of computing requests, wherein an execution parameter is a modifiable parameter affecting execution of the plurality of computing requests, and wherein the update is performed during execution of the plurality of computing requests;
      determining a reward value of said update; and
      modifying a previously estimated reward value of said update;
      wherein the modified reward value is usable in selecting one of a plurality of available actions in a subsequent application of the reinforcement learning technique; and
      wherein each of the plurality of actions comprises a specified update to a given execution parameter.

* * * * *